(12) United States Patent  (10) Patent No.: US 8,800,937 B1
Lee et al.  (45) Date of Patent: Aug. 12, 2014

(54) ADJUSTABLE LAPTOP STAND FOR A LAPTOP COMPUTER

(75) Inventors: Chia Feng Lee, Longjing (TW); Hsin-Hao Hsu, Zhubei (TW); Li-Jen Chien, Zhubei (TW); Simone Chevalley, Lausanne (CH); Sylvain Sauvage, La Tour-de-Peilz (CH); Alain Tabasso, Essertines (CH); Cathal Loughnane, Bray County Wicklow (IE)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 12/829,202

(22) Filed: Jul. 1, 2010

Related U.S. Application Data

(60) Provisional application No. 61/222,405, filed on Jul. 1, 2009.

(51) Int. Cl.
*F16L 3/08* (2006.01)

(52) U.S. Cl.
USPC .............................. 248/65; 248/917; 248/920

(58) Field of Classification Search
USPC ......... 248/456, 454, 455, 457, 903, 918, 919, 248/688, 65, 460, 462, 453, 448, 449, 458, 248/125.1, 125.3, 923, 463, 917, 920, 121, 248/176.1, 451, 450, 447, 444, 127, 133, 248/150
See application file for complete search history.

(56) References Cited

U.S. PATENT DOCUMENTS

| | | | | |
|---|---|---|---|---|
| 2,008,093 A * | 7/1935 | Carwardine | ................... | 248/472 |
| 2,591,170 A * | 4/1952 | Levinson et al. | ............. | 248/456 |
| 3,128,573 A * | 4/1964 | Cook et al. | .................... | 248/445 |
| 3,460,795 A * | 8/1969 | Dahlin | ......................... | 248/452 |
| 3,936,026 A * | 2/1976 | Hampel et al. | ............. | 248/349.1 |
| 4,739,960 A * | 4/1988 | Adler | ............................. | 248/453 |
| 5,451,025 A * | 9/1995 | Hames | ........................ | 248/456 |
| 5,503,361 A * | 4/1996 | Kan-O et al. | ................. | 248/688 |
| 6,082,696 A * | 7/2000 | Patterson | ...................... | 248/454 |
| 6,189,850 B1 * | 2/2001 | Liao et al. | ................ | 248/292.14 |
| 6,971,622 B2 * | 12/2005 | Ziegler et al. | ................. | 248/454 |
| 6,975,507 B2 * | 12/2005 | Wang et al. | .............. | 361/679.21 |
| 6,992,882 B2 * | 1/2006 | Wang | ........................ | 361/679.57 |
| 7,011,285 B2 * | 3/2006 | Wang et al. | .................. | 248/673 |
| 7,239,506 B2 * | 7/2007 | Ogawa et al. | ............. | 361/679.22 |
| 7,301,759 B2 * | 11/2007 | Hsiung | ..................... | 361/679.27 |
| 7,478,788 B2 * | 1/2009 | Hsu | ............................... | 248/371 |
| 7,487,940 B2 * | 2/2009 | Saez et al. | .................. | 248/176.1 |
| 7,758,009 B1 * | 7/2010 | Chang | ........................... | 248/460 |
| 7,762,519 B2 * | 7/2010 | Kunii et al. | .................... | 248/688 |

(Continued)

*Primary Examiner* — Terrell McKinnon
*Assistant Examiner* — Monica Millner
(74) *Attorney, Agent, or Firm* — Kilpatrick Townsend & Stockton LLP

(57) ABSTRACT

A laptop stand configured to support a laptop computer on a surface at a plurality of angles includes a platen configured to support the laptop computer. A leg is pivotally coupled to the platen. A support arm is slide coupled to the platen and pivotally coupled to the leg. A latch is coupled to the support arm and is configured to latch and to unlatch from the platen at a plurality of latch points. The latch at the plurality of latch points positions the support arm at a first plurality of angles with respect to the platen and the leg. The latch at the plurality of latch points also positions the platen and the leg at a second plurality of angles with respect to one another. The latch is configured to slide with respect to the platen to move the support arm to rotate the leg with respect to the platen.

30 Claims, 23 Drawing Sheets

(56) References Cited

U.S. PATENT DOCUMENTS

| | | | |
|---|---|---|---|
| 7,770,864 B2 * | 8/2010 | Phifer et al. | 248/455 |
| 7,828,260 B2 * | 11/2010 | Hauser et al. | 248/456 |
| 7,864,262 B2 * | 1/2011 | Chen et al. | 349/58 |
| 7,887,021 B2 * | 2/2011 | Shevin-Sandy | 248/447.1 |
| 7,926,429 B2 * | 4/2011 | Wu | 108/43 |
| 7,986,527 B2 * | 7/2011 | Sween et al. | 361/695 |
| 8,089,760 B2 * | 1/2012 | Yi-Chang | 361/679.59 |
| 8,109,527 B2 * | 2/2012 | Bustle et al. | 280/47.35 |
| 8,118,274 B2 * | 2/2012 | McClure et al. | 248/688 |
| 8,123,189 B2 * | 2/2012 | Phifer et al. | 248/460 |
| 8,146,869 B2 * | 4/2012 | Wang et al. | 248/125.2 |
| 2003/0001064 A1 * | 1/2003 | Book | 248/460 |
| 2004/0007649 A1 * | 1/2004 | Vettraino | 248/127 |
| 2005/0001114 A1 * | 1/2005 | Ogawa | 248/127 |
| 2005/0207112 A1 * | 9/2005 | Bakker et al. | 361/686 |
| 2005/0253040 A1 * | 11/2005 | Yang | 248/688 |
| 2006/0124822 A1 * | 6/2006 | Munda et al. | 248/454 |
| 2007/0206349 A1 * | 9/2007 | Jacobs | 361/683 |
| 2008/0192424 A1 * | 8/2008 | Lee | 361/683 |
| 2009/0170132 A1 * | 7/2009 | Pevsner | 435/7.23 |
| 2010/0012810 A1 * | 1/2010 | Hu | 248/408 |

* cited by examiner

Lift latch to release the fold mode

Open the latch to unlock the angle adjustment function

Latch Lock

Latch Unlock

ADJUSTABLE LAPTOP STAND FOR A LAPTOP COMPUTER

CROSS REFERENCE TO RELATED APPLICATIONS

This application claims priority to, and the benefit of, U.S. Provisional Patent Application No. 61/222,405, filed Jul. 1, 2009, titled "ADJUSTABLE LAPTOP STAND FOR A LAPTOP COMPUTER," of Chia Feng Lee et al. and which is incorporated by reference herein in its entirety for all purposes.

BACKGROUND OF THE INVENTION

The present invention generally relates to a laptop stand for a laptop computer. More specifically, the present invention relates to an adjustable laptop stand for a laptop computer where the adjustable laptop stand includes a leg configured to be set at a variety of angles with respect to a platen to angle the platen at a variety of angles with respect to a work surface where the platen is configured to contact the laptop computer.

Laptop stands for laptop computers are devices that hold a laptop computer for ease of use of the laptop computer. These laptop stands are often configured for a variety of uses. For example, a first type of laptop stand is configured for use on a person's lap to inhibit heat transfer from the supported laptop computer to the user's legs. In this way, these laptop stands operate as heat barriers. Often these laptop stands also include heat transfer devices, such as fans and vents, which are configured to move heat away from a laptop computer. Another type of laptop stand for laptop computers are fixed devices that are configured for desktop use and support a laptop computer at a fixed angle for comfortable use. Still another type of laptop stand for laptop computers provides adjustable platens so that the user may set a comfortable angle for use of a laptop computer.

Manufacturers of laptop stands continue to strive to develop new laptop stands that are slim for easy transport, easy use, and provide multiple angular settings for comfortable laptop computer use.

BRIEF SUMMARY OF THE INVENTION

The present invention generally relates to a laptop stand for a laptop computer. More specifically, the present invention relates to an adjustable laptop stand for a laptop computer where the adjustable laptop stand includes a leg configured to be set at a variety of angles with respect to a platen to angle the platen at a variety of angles with respect to a work surface where the platen is configured to contact the laptop computer.

According to one embodiment, the laptop stand configured to support a laptop computer on a surface at a plurality of angles includes a platen configured to support the laptop computer. A leg is pivotally coupled to the platen. A support arm is slide coupled to the platen and pivotally coupled to the leg. A latch is coupled to the support arm and is configured to latch and to unlatch from the platen at a plurality of latch points. The latch at the plurality of latch points positions the support arm at a first plurality of angles with respect to the platen and the leg. The latch at the plurality of latch points also positions the platen and the leg at a second plurality of angles with respect to one another. The latch is configured to slide with respect to the platen to move the support arm to rotate the leg with respect to the platen.

According to one specific embodiment, the latch and the platen each include sets of magnets to guide the latch to the latch points. According to another specific embodiment, the platen includes a bottom portion and the leg includes a bottom portion configured to contact a surface, and wherein the leg and the platen at the second plurality of angles are configured to angle a laptop computer on the platen at a third plurality of angles with respect to the surface.

According to another specific embodiment, the leg includes a swivel disk coupled to the bottom portion of the leg, and wherein the swivel disk is configured as a rotation center for the leg and the platen positioned on a surface. The swivel disk may be hinge coupled and rotationally coupled to the bottom portion of the leg.

According to another specific embodiment, the platen includes an opening formed therein and the leg and support arm are configured to fold into the opening with the latch unlatched from the platen. The platen, the leg, and the support arm are substantially parallel if the leg and support arm are folded into the opening in the platen.

According to another specific embodiment, the latch is configured as a spring device to lift the support arm and the platen from inside the opening. More specifically, the latch is configured as the spring device for being pushed downward and upward to lift the support arm and the platen from inside the opening.

According to another specific embodiment, the platen includes a top configured to support a laptop computer and further includes a bottom that is oppositely disposed with respect to the top surface and the bottom includes the opening formed in the platen. The bottom of the platen includes a set of slide mounts having a set of slots formed therein and the slots are configured to receive the support arm at opposite sides of the support arm to slide couple the support arm to the platen. The slide mounts are in the opening formed in the bottom of the platen.

According to another specific embodiment, the leg includes an opening formed therein and the support arm includes a cable management device, which extends at least partially through the opening formed in the leg. The cable management device extends toward a back direction of the laptop stand, wherein the back direction faces away from a forward direction that a laptop computer faces positioned on the platen. The cable management device includes a plurality of hooked arms where an opening is formed between each two adjacent ones of the hooked arms. The hooked arms are configured to hold computer cables for a laptop computer, a printer coupled to the laptop compute, etc.

A better understanding of the nature and advantages of the present invention may be gained with reference to the following detailed description and the accompanying drawings.

BRIEF DESCRIPTION OF THE DRAWINGS

FIGS. 5A, 5B, and 5C show the leg positioned at a variety of angles θ with the respect to the platen, and show the platen at a variety of angles φ with respect to a surface, which the laptop stand is sitting on;

DETAILED DESCRIPTION OF THE INVENTION

The present invention provides a laptop stand for a laptop computer. More specifically, the present invention provides an adjustable laptop stand for a laptop computer where the adjustable laptop stand includes a leg configured to be set at a variety of angles with respect to a platen, which is configured to contact a laptop computer.

Figure 1A:
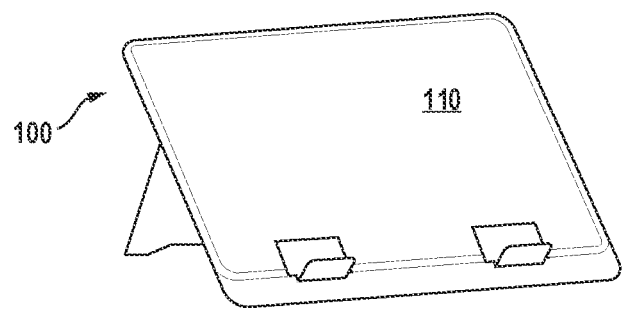
FIGS. 1A, 1B, and 1C are front perspective views of a laptop stand according to one embodiment of the present invention.
Figure 1B:
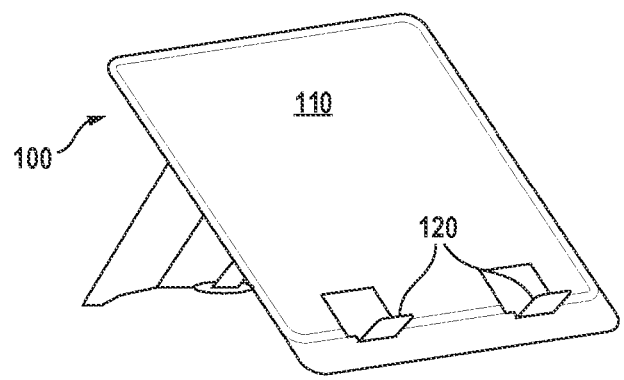
Figure 1C:
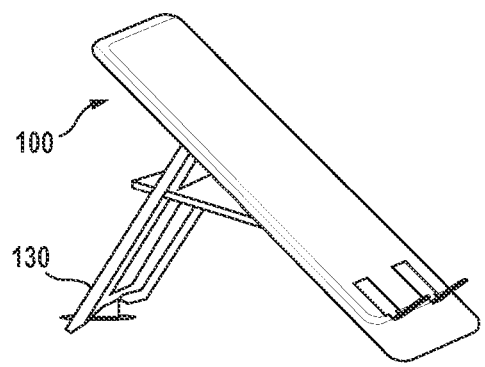
Figure 2A:
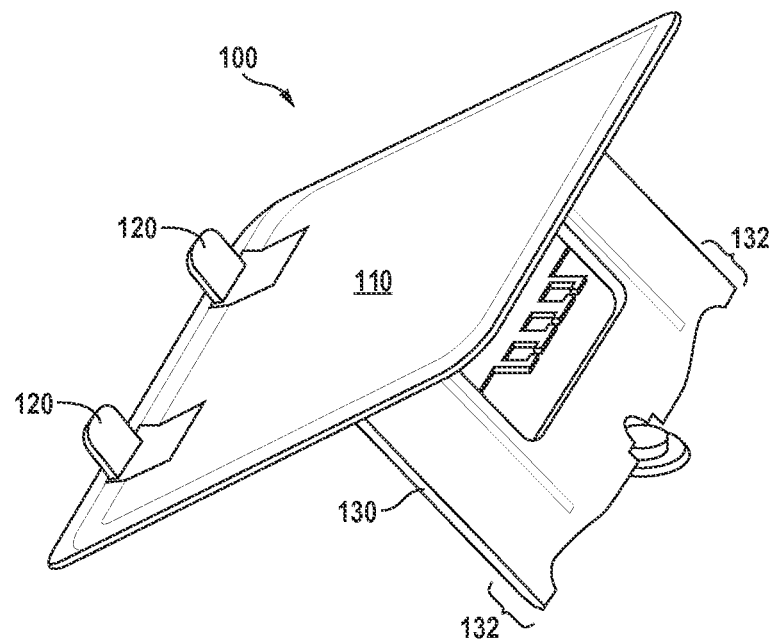
FIGS. 2A and 2B are upper perspective views of the laptop stand.
Figure 2B:
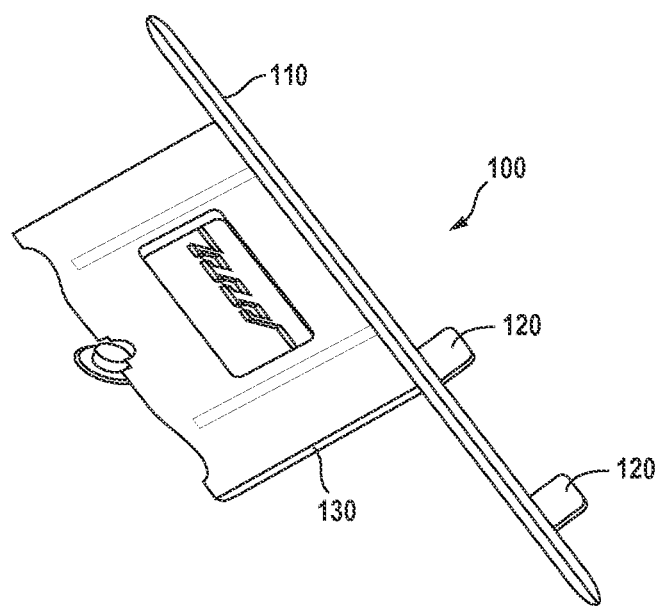
Figure 3A:
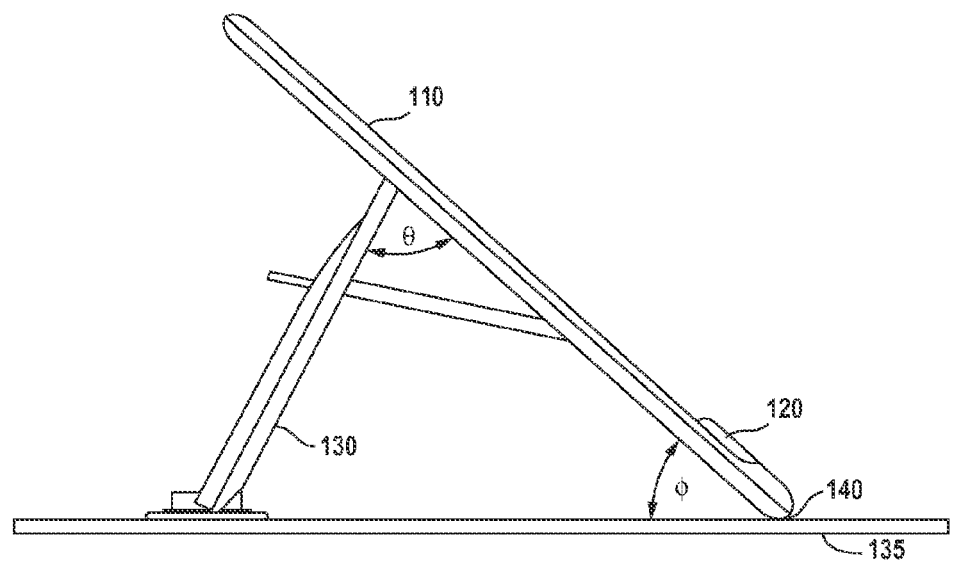
FIG. 3A is a side view of the laptop stand.
Figure 3B:
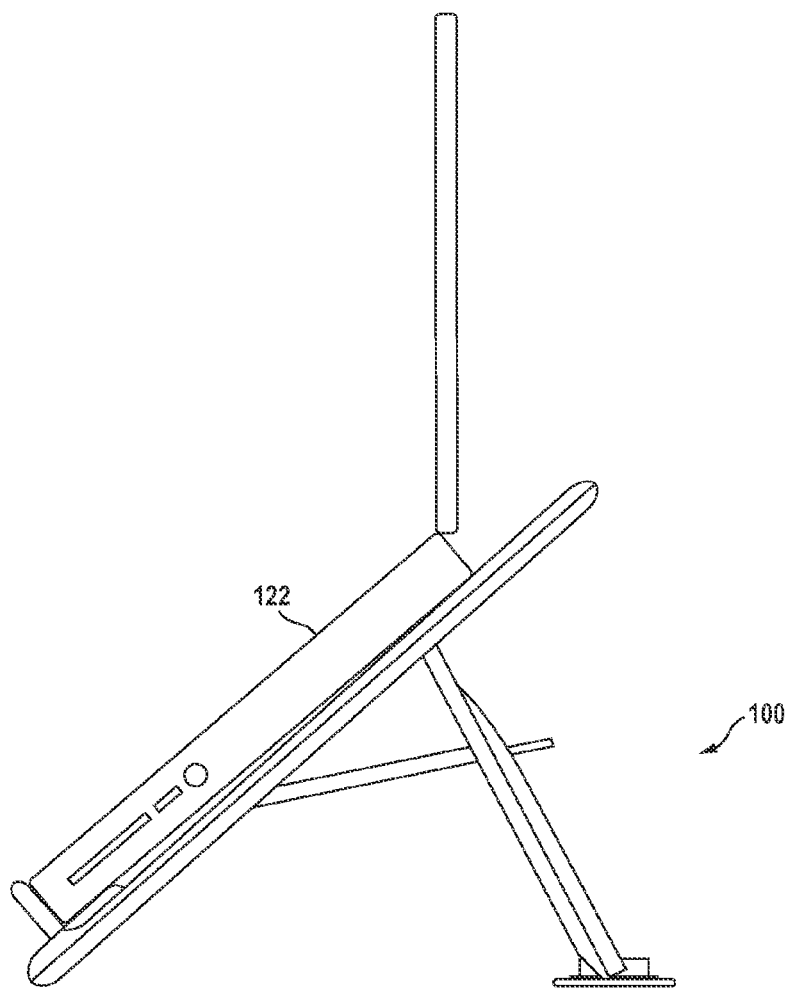
FIG. 3B is a side view of the laptop stand with the fold out stops folded out and a laptop computer on the laptop stand.
Figure 4A:
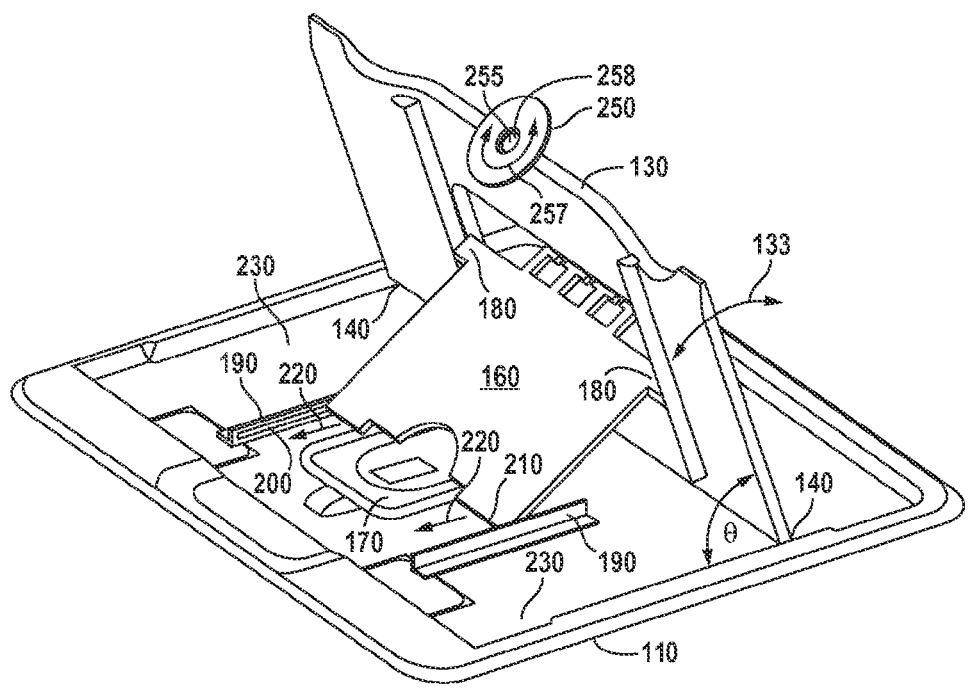
FIG. 4A is a first underside view of the laptop stand.
Figure 4B:
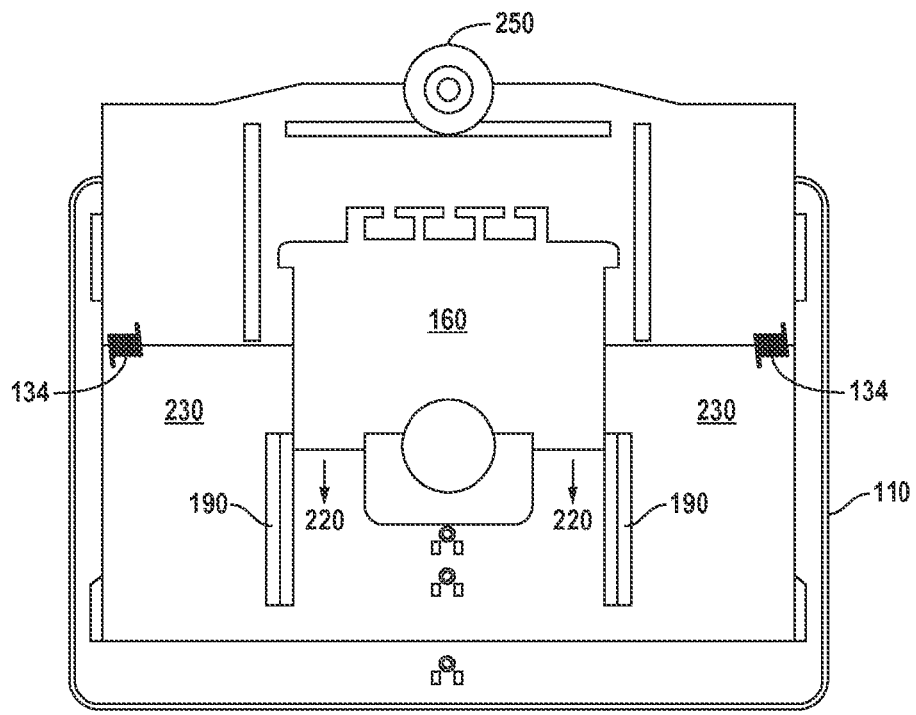
FIG. 4B is a second underside view of the laptop stand.

FIGS. 1A, 1B, and 1C are front perspective views of a laptop stand 100 according to one embodiment of the present invention. Laptop stand 100 includes a platen 110, a set of foldout stops 120, and a leg 130. FIGS. 2A and 2B are upper perspective views of laptop stand 100. FIG. 3A is a side view of laptop stand 100. FIG. 3B is another side view of the laptop stand and shows a laptop computer 122 on the laptop stand. FIG. 4A is a first underside view of laptop stand 100, and FIG. 4B is a second underside view of the laptop stand.

According to one embodiment, leg 130 is configured to angularly extend from the platen at a given angle θ (see FIG. 3A). In this configuration, a bottom of the leg 133 and a bottom portion 140 of the platen are configured to be placed on a surface 135, such as a desk, so that the platen is positioned at an angle φ with respect to the surface. Platen 110 is configured to receive a laptop computer thereon and hold the base of a laptop computer at the angle φ.

Foldout stops 120 are hinge mounted to the platen. In a "folded out" position, the foldout stops are configured to inhibit a laptop computer 122 from sliding downward along the platen. See FIG. 1A. In a "folded in" position, the foldout stops are configured to be approximately flush mounted with respect to the platen. See FIGS. 3A and 3B.

According to the embodiment of the laptop stand shown in FIG. 4A, leg 130 is coupled to the platen via a set of hinges 140. A set as referred to herein may include one or more elements. Hinges 140 are one example of a rotational-coupling device for rotationally coupling leg 130 to platen 110.

Figure 5A:
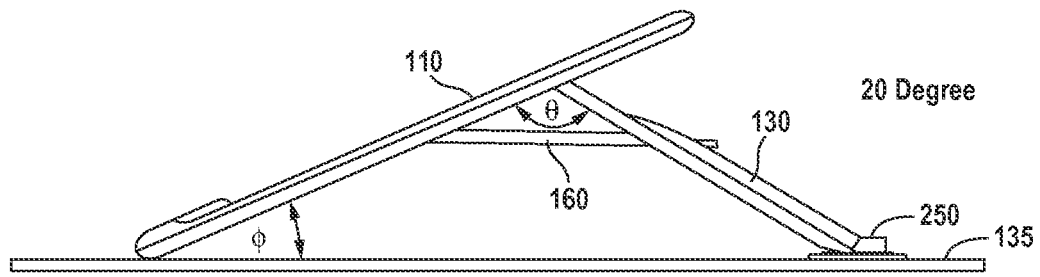
Figure 5B:
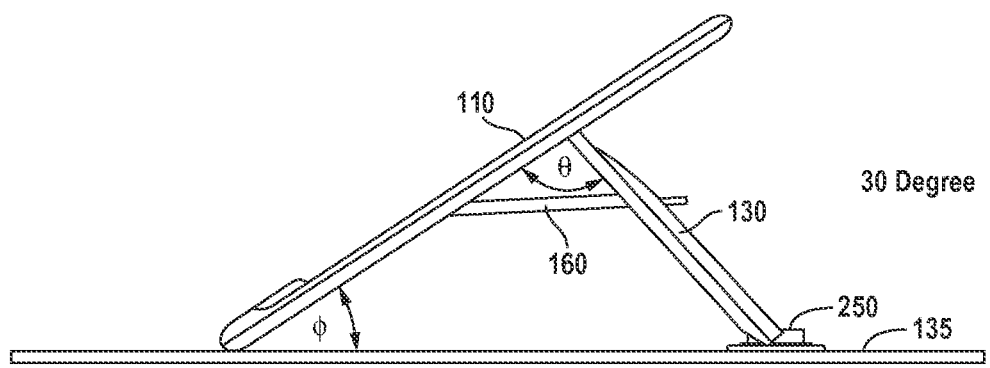
Figure 5C:
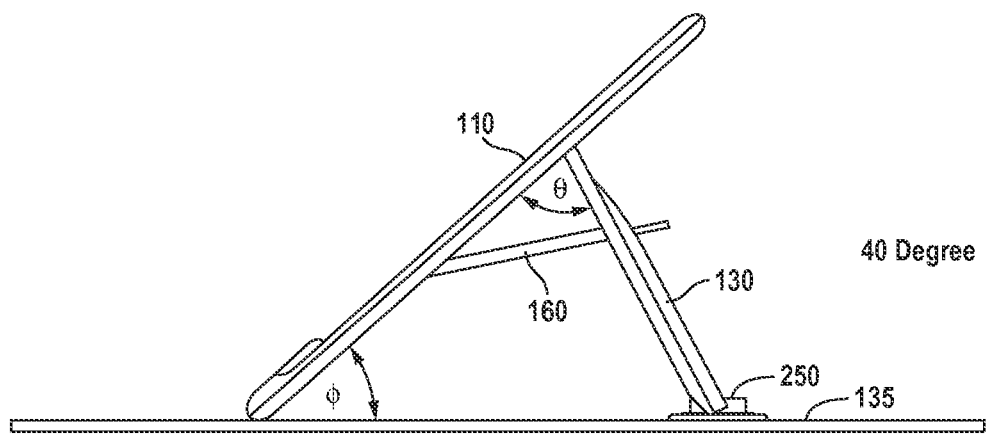

Other rotational-coupling devices may be configured to rotationally couple the leg to the platen. Hinges 140 are configured to permit leg 130 to rotate with respect to platen 110 as indicated by arrow 133. Referring to FIG. 4B, the laptop stand may include a set of springs 134, which are configured to push the leg "open" from the platen from a "folded in" position. The laptop stand includes a support arm 160 and a latch 170 coupled to support arm 160. The support arm and latch are configured to fix the leg with respect to the platen at a variety of angles θ. Thereby, the platen may be positioned at a variety of angles φ with respect to a surface (e.g., a desktop) on which the laptop stand is placed. FIGS. 5A, 5B, and 5C show leg 110 positioned at a variety of angles θ with the respect to the platen, and show the platen at a variety of angles φ with respect to surface 135. According to one embodiment, the angle φ may be 20°, 30°, or 40° with respect to surface 135. The platen may be placed at other angles with respect to the surface according to other embodiments. Those of skill in the art will understand that the described angles are exemplary and not limiting on the claims.

According to one embodiment, support arm 160 is hinge mounted to the leg via a set of hinges 180. Support arm 160 is slide mounted to the platen via a set of slide mounts 190. The slide mounts may have slots 200 formed therein in which a pin of the support arm is configured to slide in slots 200 relative to the slide mounts. Slots 200 provide confined movement of a top portion 210 of the support arm linearly along the platen as indicated by the arrows 220.

Figure 4C:
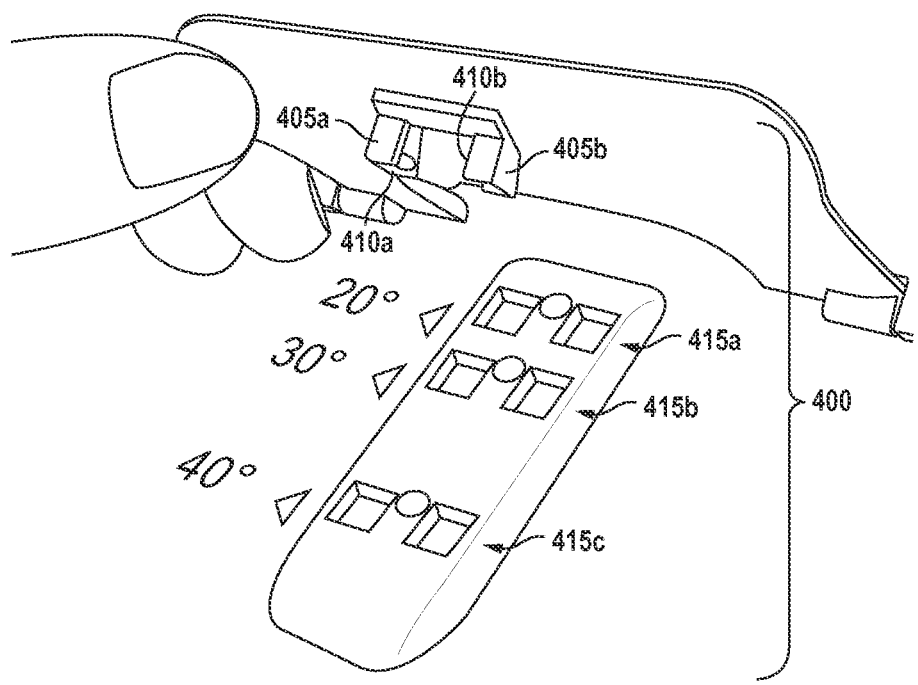
FIGS. 4C and 4D are detailed views of a portion of the latch and a portion of the platen and generally show a set of latch devices configured to latch the latch to the platen.
Figure 4D:
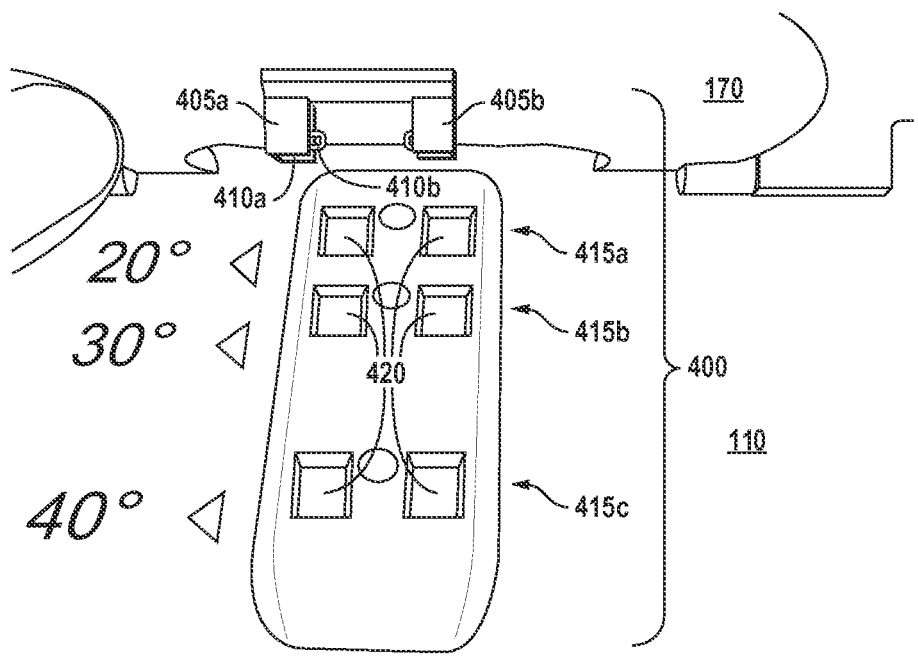

According to one embodiment, latch 170 is configured to fix support arm 160 to platen 110 at a variety of positions to set the angle θ between leg 130 and the platen 110. FIGS. 4C and 4D are detailed views of a portion of latch 170 and a portion of platen 110 and generally show a set of latch devices 400 configured to latch the latch to the platen. According to the embodiment of the laptop stand shown in FIGS. 4C and 4D, the set of latch devices 400 includes latch towers 405a and 405b disposed on latch 170. Latch tower 405a includes a hook 410a and latch tower 405b includes a hook 410b. Hooks 410a and 410b may be metal and may be configured to be retractable into their respective latch towers under a pushing force, and are configured to spring from the retraced position if the pushing force is reduced or removed. The set of latch devices 400 further includes paired sets of latch openings 415a, 415b, and 415c formed in platen 110. Each latch opening may have a shape that substantially compliments the shape of one of the latch towers for receiving the latching tower into the latch opening mechanism. Each latch opening may have a ledge 420 that is configured to receive one of the hooks. Each ledge may be undercut to substantially securely hold one of the hooks. The hooks may be configured to retract as the hooks are pressed against the ledge. The hooks may be spring loaded and when compressed supply a pressing force against the ledge to hold the latch towers in the latch openings. According to one alternative embodiment, the latch towers may be on the platen, and the latch openings may be on the latch. According to another alternative, the set of latch devices may include a pin or the like (e.g., on the latch), and may include a set of pin openings (e.g., on the platen) into which the pin is configured to sit. According to one embodiment, the platen may include a set of magnets (not shown) proximate to the latch device, and the latch may include a set of magnets (not shown) proximate to the latch device. The set of magnets in the platen and the set of magnets in the latching mechanism may have their magnetic poles arranged so that these magnets attract each other. The positions of the magnets on the platen and the latch may be such that a maximum attraction occurs between the magnets if the latch towers are centered on the tower opening to aid the alignment of the latch tower to the latch holes. The latching towers (or alternatively the pin) are sometimes generally referred to herein as a latching mechanism and the tower openings (or alternatively the pin openings) are sometimes referred to herein as complimentary latching mechanisms.

Figure 6A:
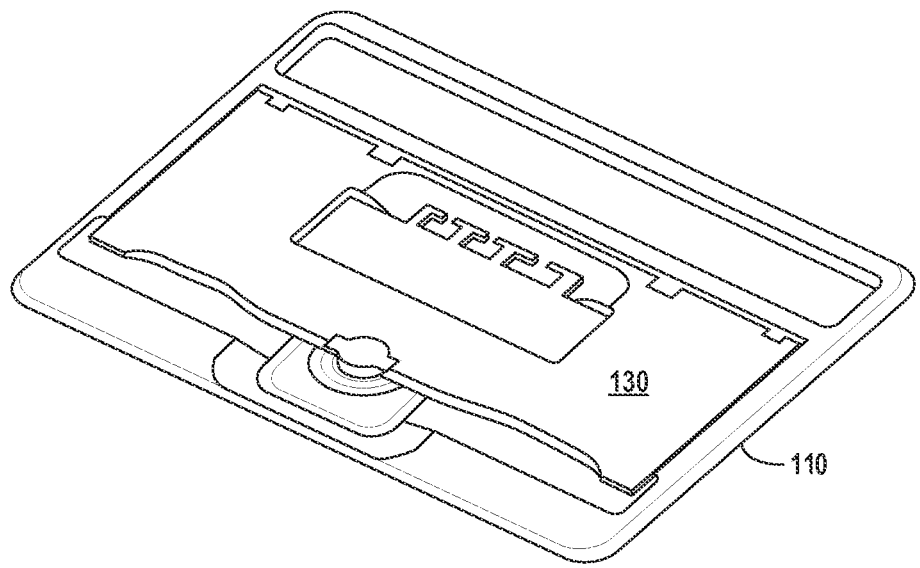
FIGS. 6A-6C are various simplified views of the laptop stand with a support arm and the leg folded into the opening formed in the platen.
Figure 6B:
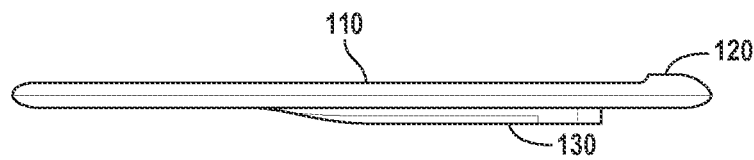
Figure 6C:
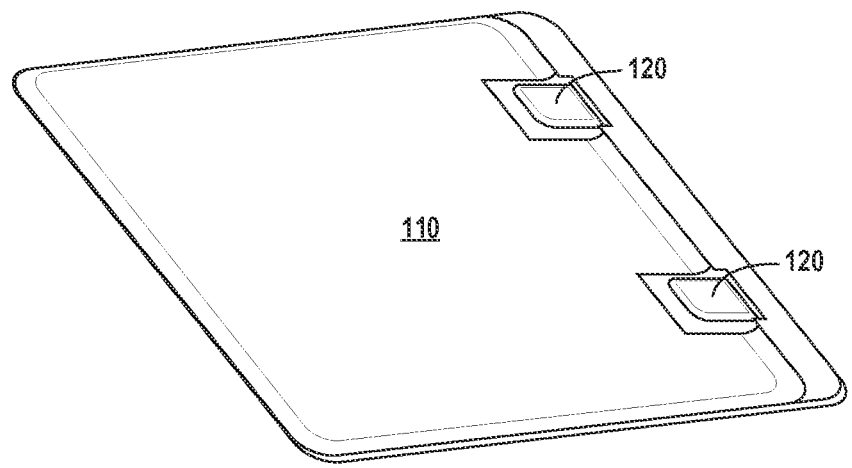

Referring again to FIG. 4A, the platen includes an extended opening 230 formed therein. Opening 230 is configured to receive support arm 160 and leg 130 with the latch uncoupled from the platen and slid forward (arrow 220). FIGS. 6A-6C are various simplified views of the laptop stand with support arm 160 and leg 130 folded into opening 230. With support arm 160 and leg 130 folded into opening 230, the support arm and the leg are configured to sit substantially parallel and substantially flush with the back of the platen in the opening formed therein.

According to one embodiment, the latch may be configured to latch to the platen with the support arm and leg folded into the opening 230 to hold the laptop stand relatively flat and compact for storage, for transport, for using flat with a laptop computer, etc.

Figure 7A:
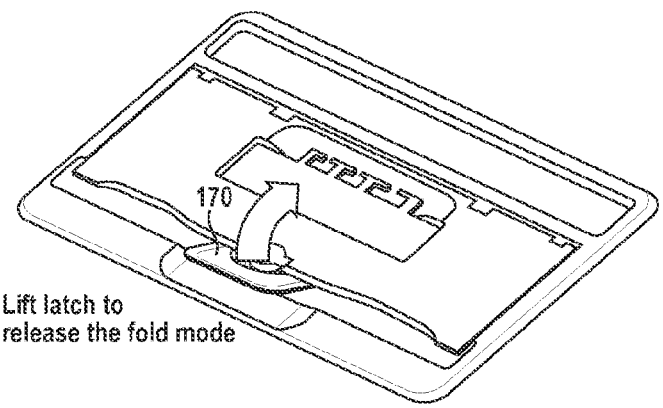
FIG. 7A is a simplified schematic of the laptop stand that includes an arrow to indicate the direction in which the latch is lifted to unlatch the latch from the platen with the support arm and the leg folded into the platen.
Figure 7B:
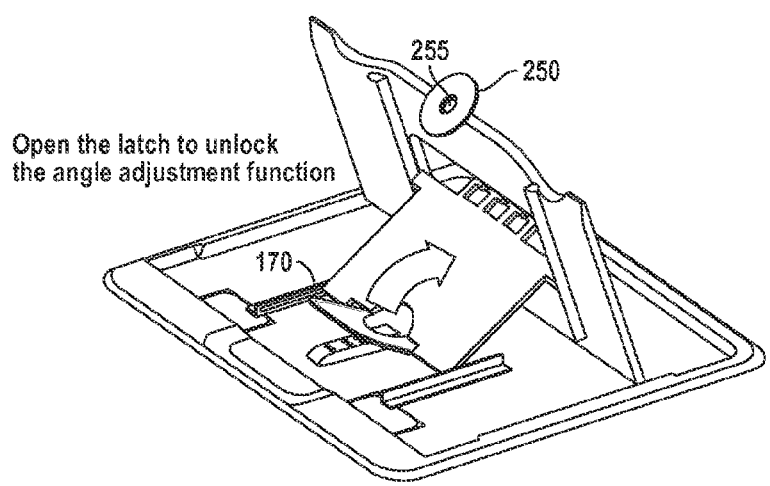
FIG. 7B is a simplified schematic of the laptop stand where the arrow in the figure indicates the direction in which the latch is lifted to unlatch the latch from the platen.
Figure 7C:
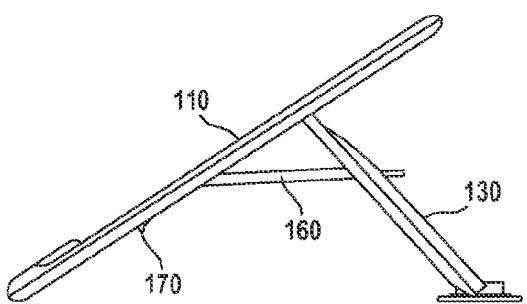
FIG. 7C is a side view of the laptop stand showing the latch latched to the platen.
Figure 7D:
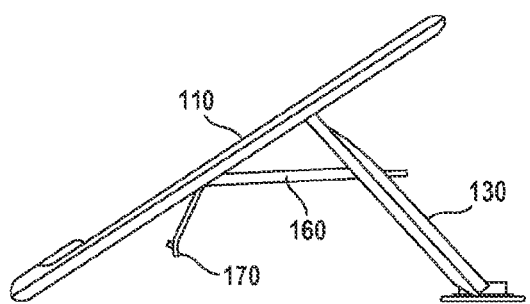
FIG. 7D is a simplified side view of the laptop stand showing the latch in an unlatched position.
Figure 8A:
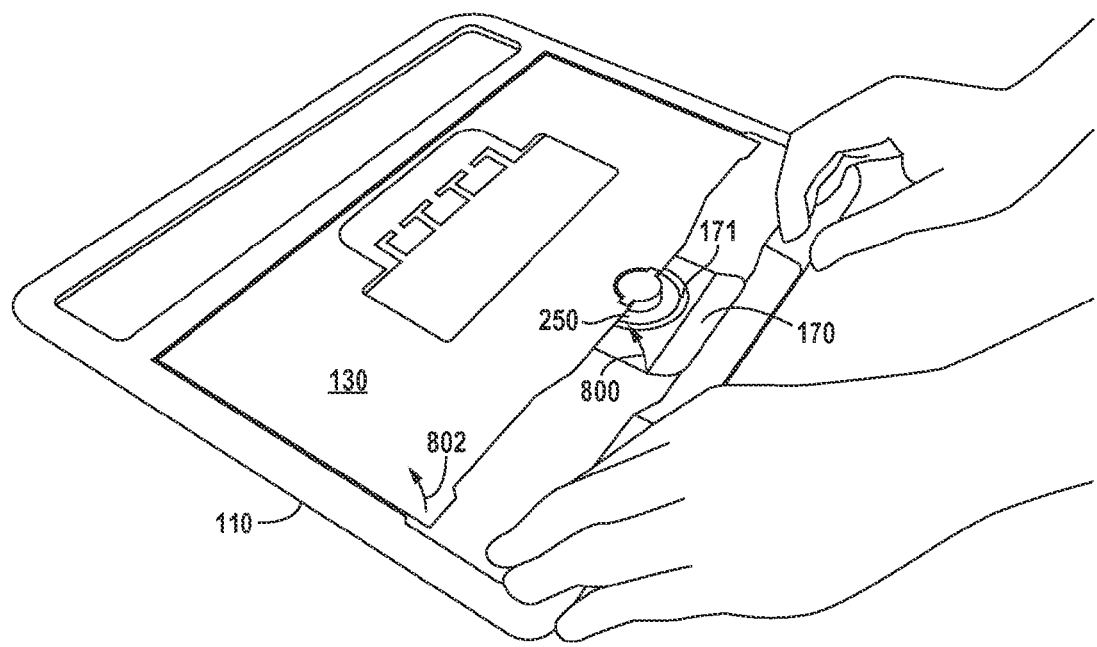
FIGS. 8A-8O show a time ordered sequence of events of a user of the laptop stand lifting the latch from a latched position to move the support arm and the leg from the opening in the platen.
Figure 8B:
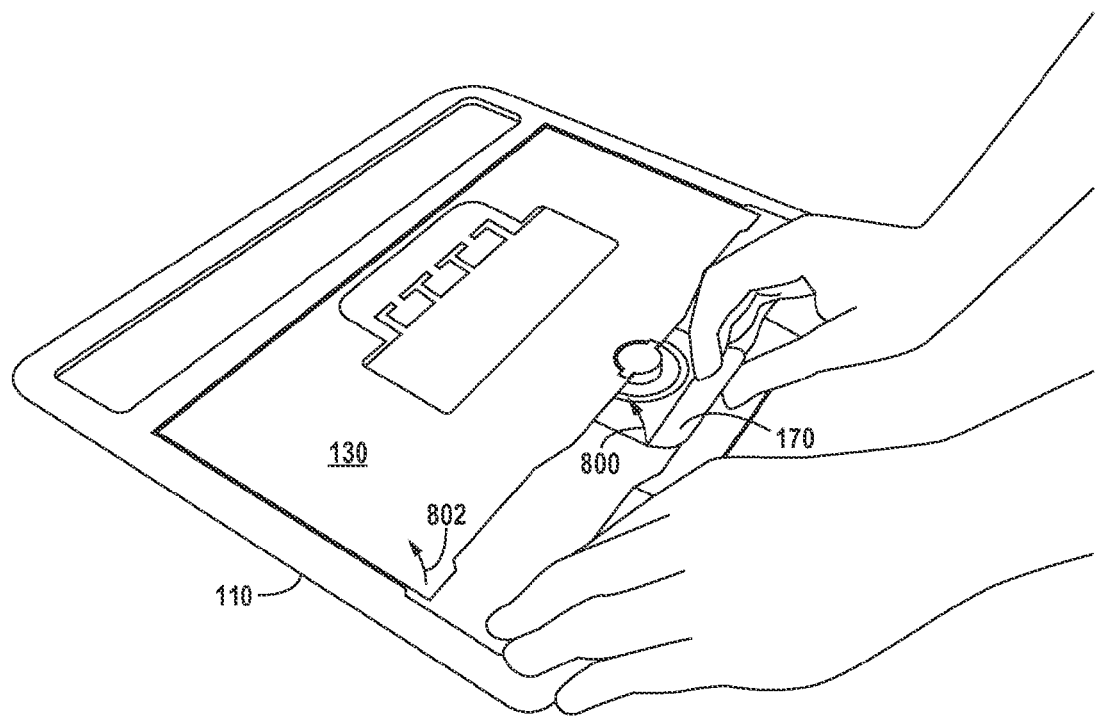
Figure 8C:
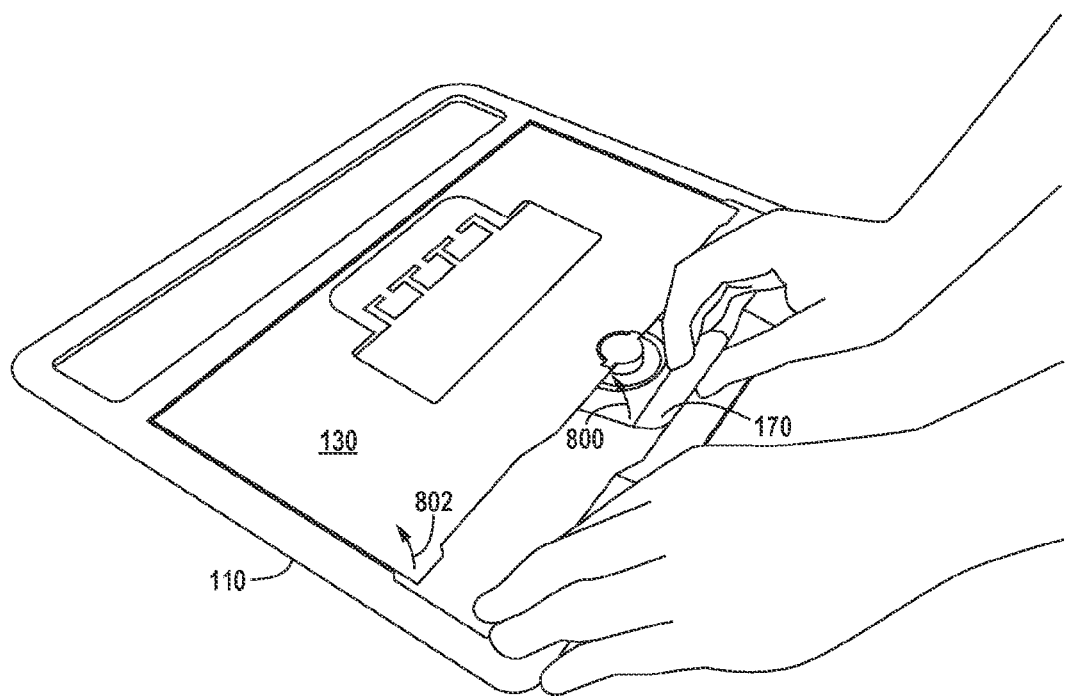
Figure 8D:
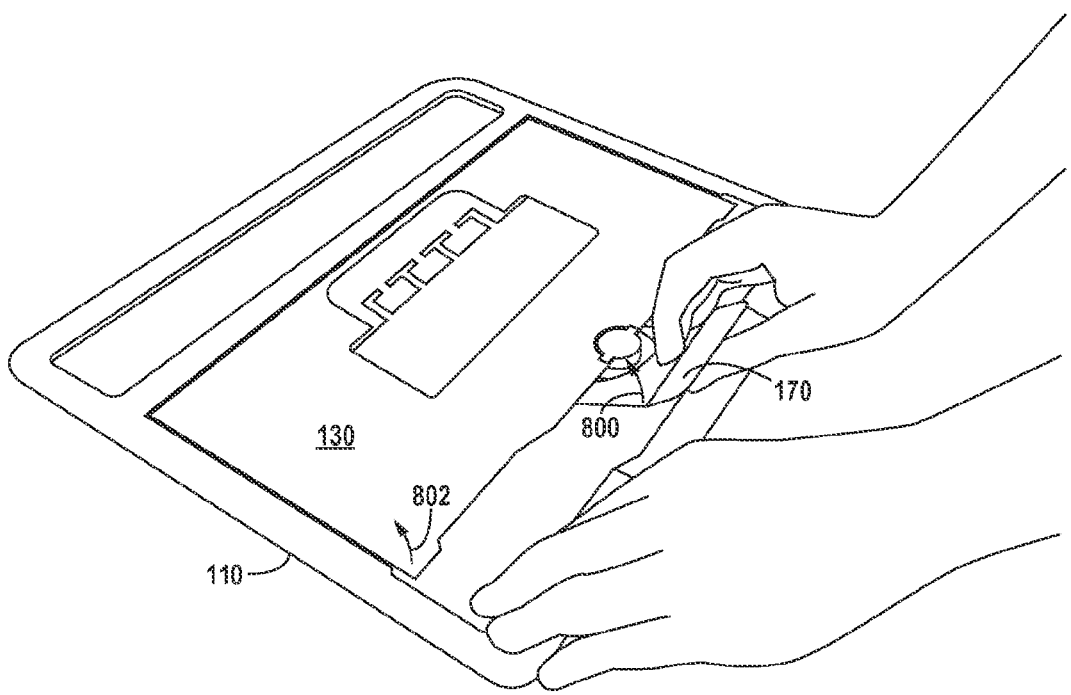
Figure 8E:
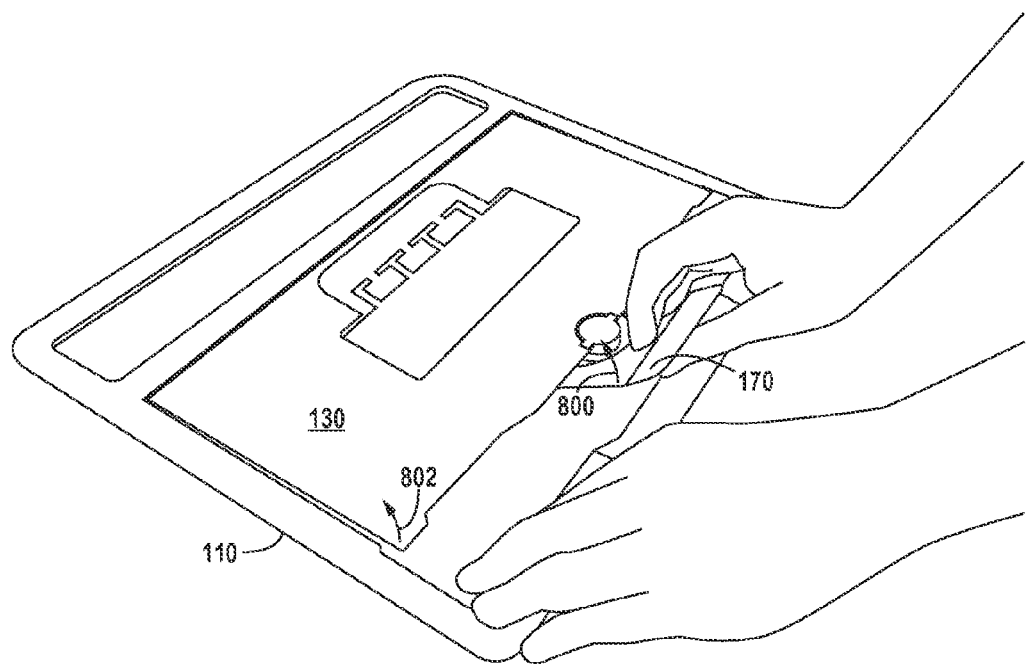
Figure 8F:
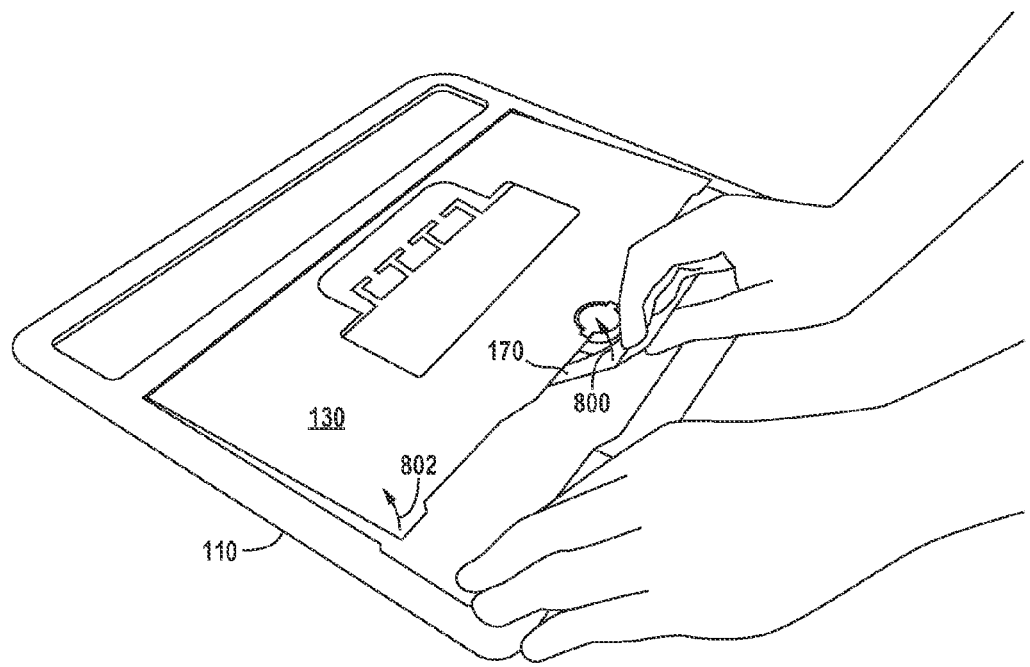
Figure 8G:
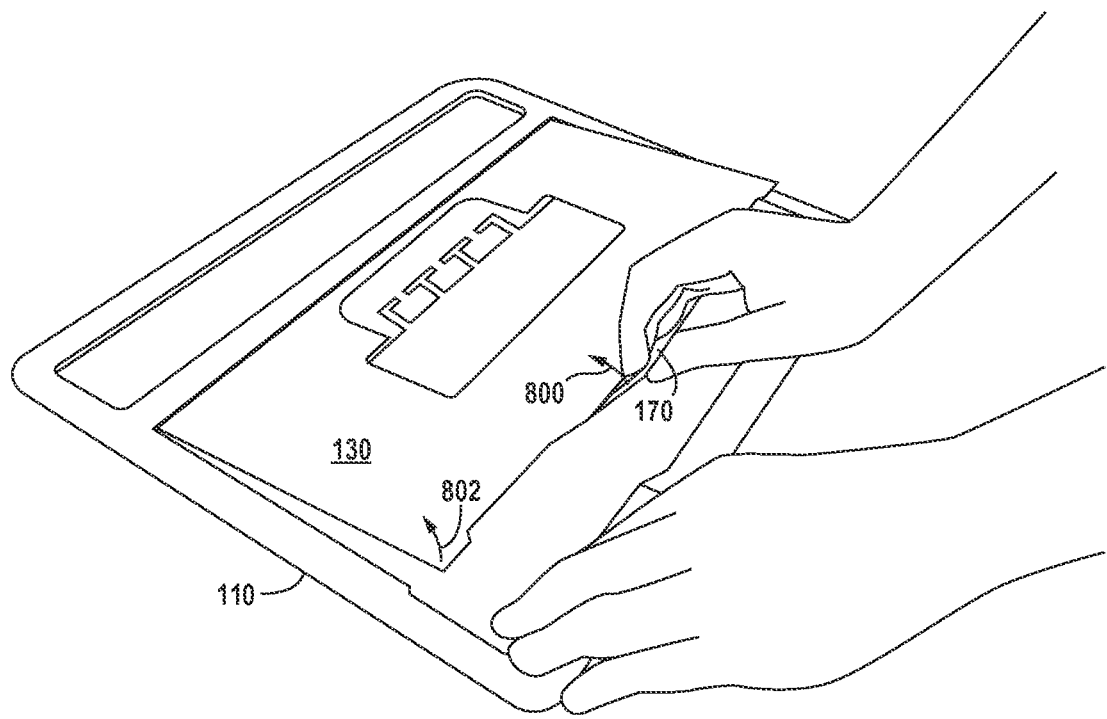
Figure 8H:
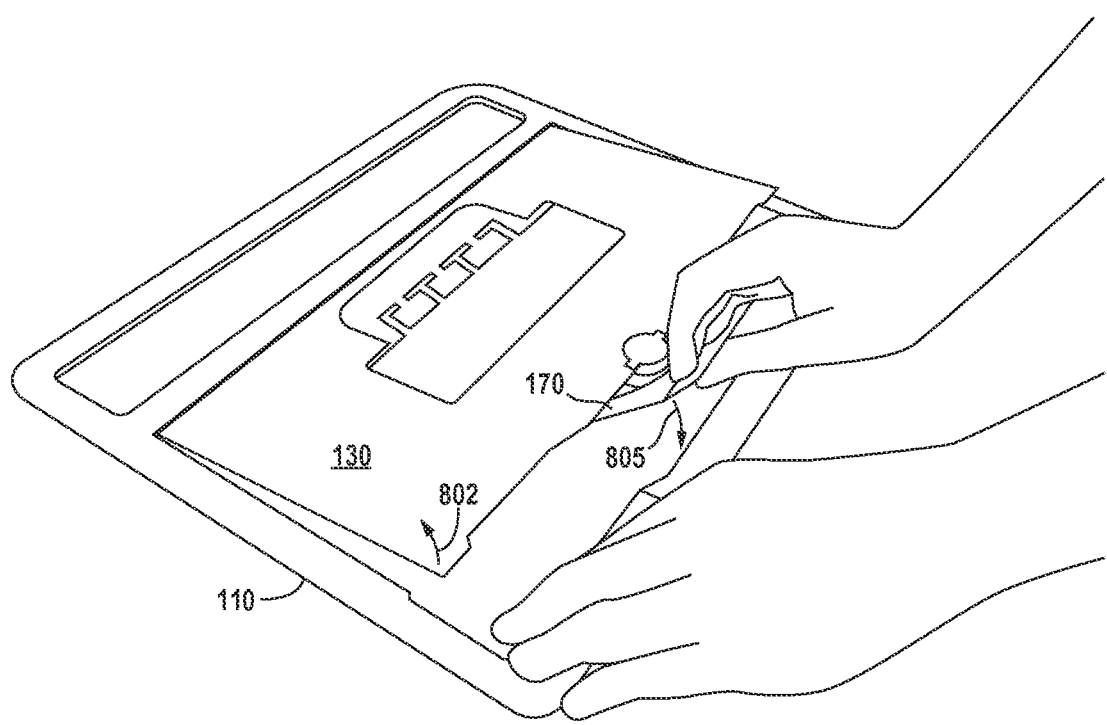
Figure 8I:
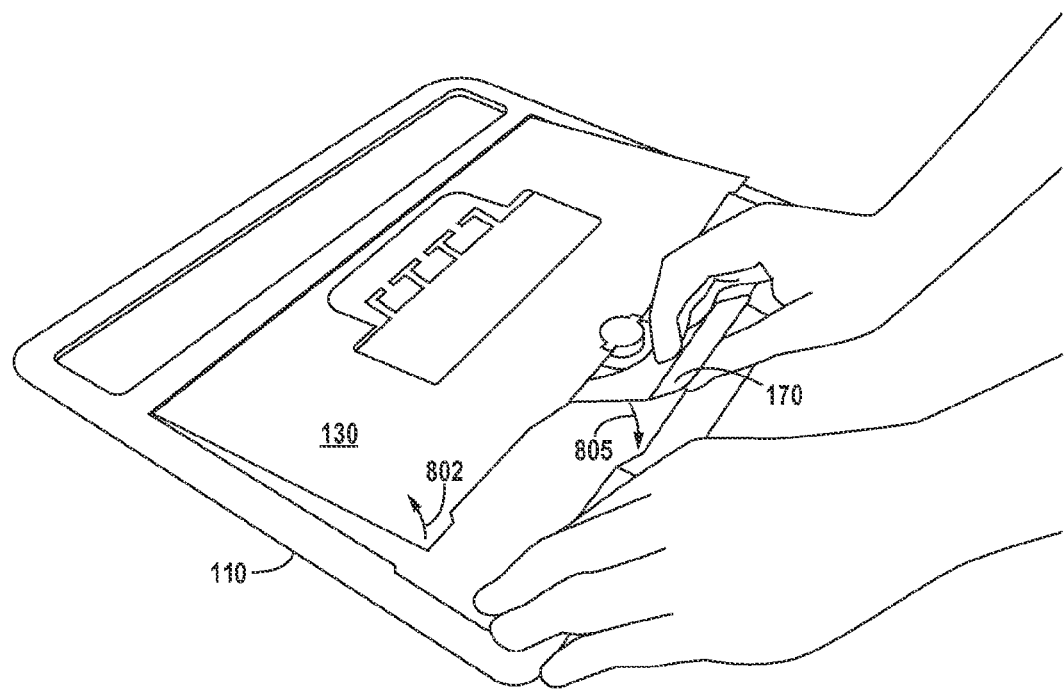
Figure 8J:
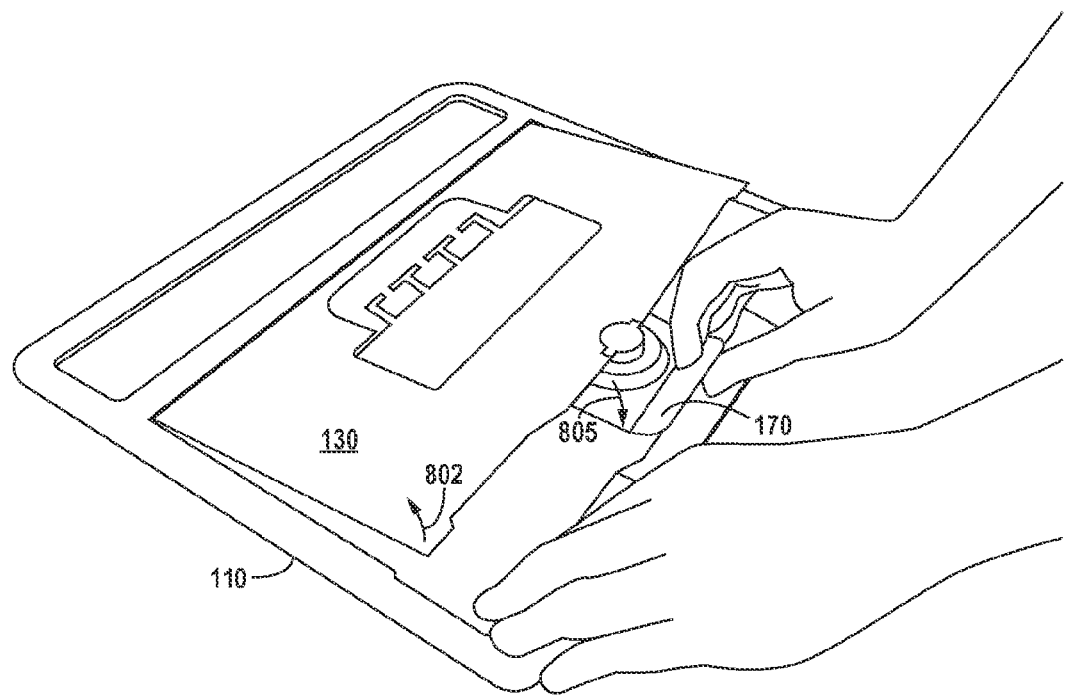
Figure 8K:
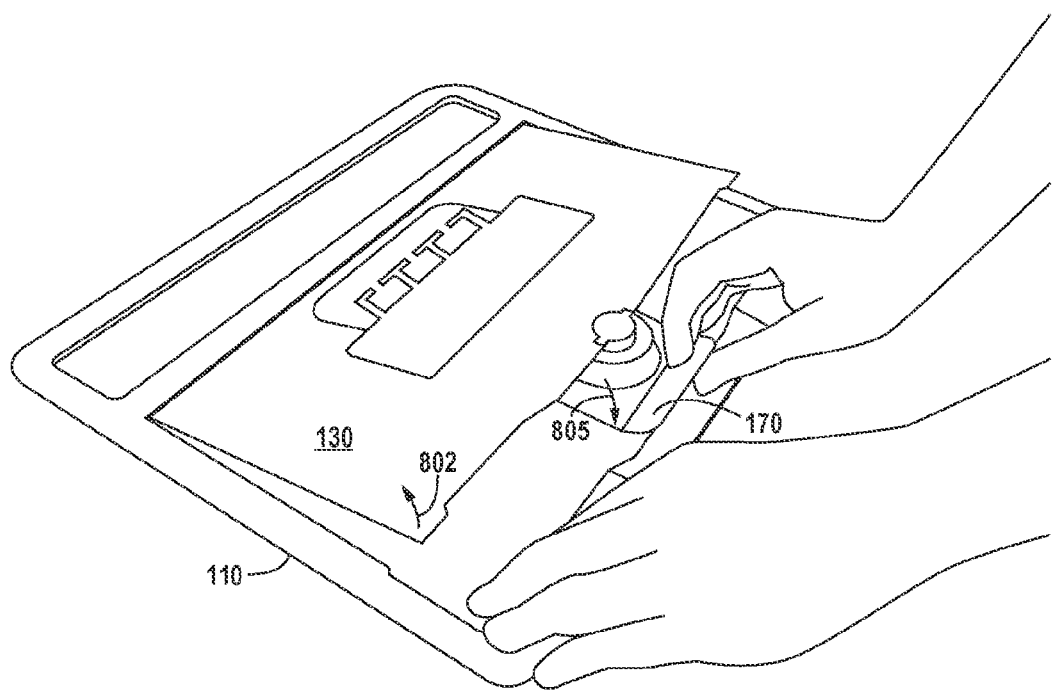
Figure 8L:
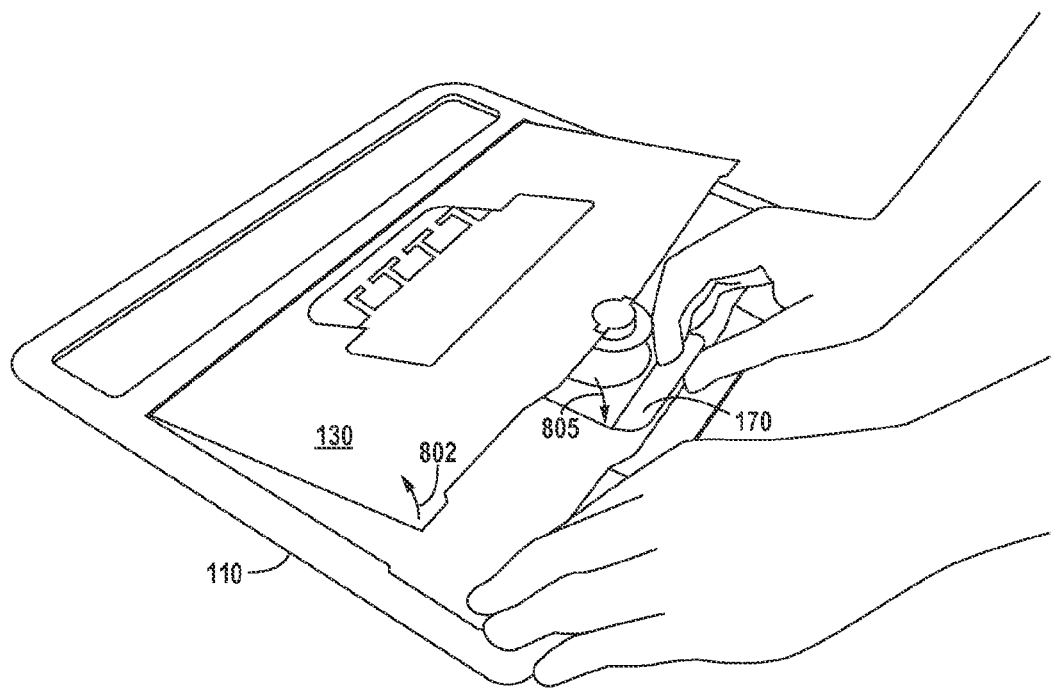
Figure 8M:
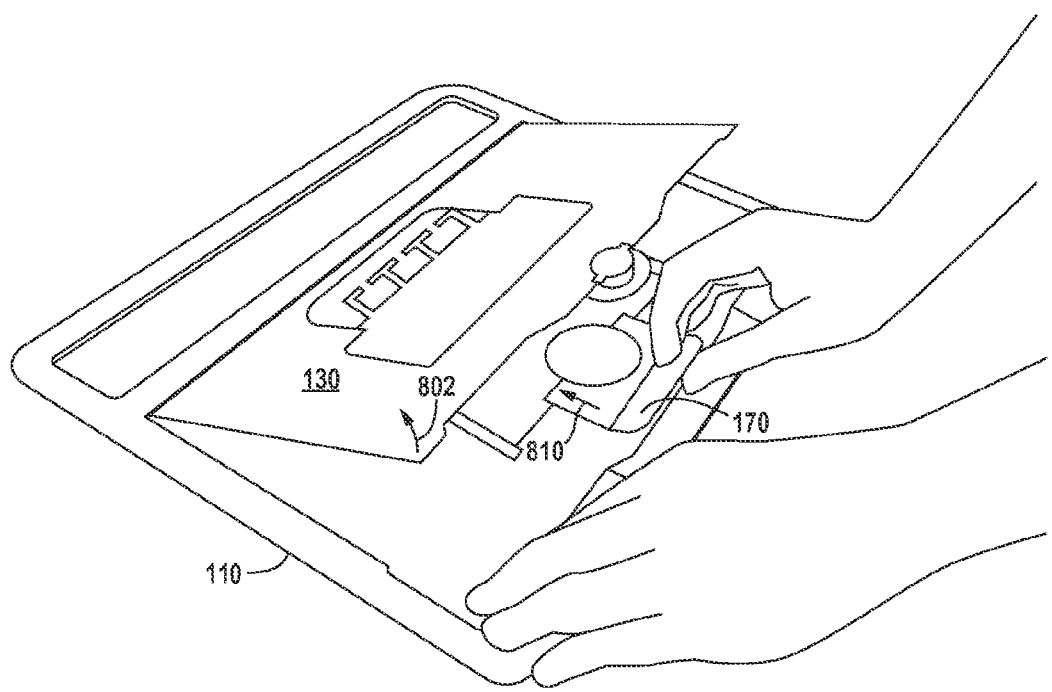
Figure 8N:
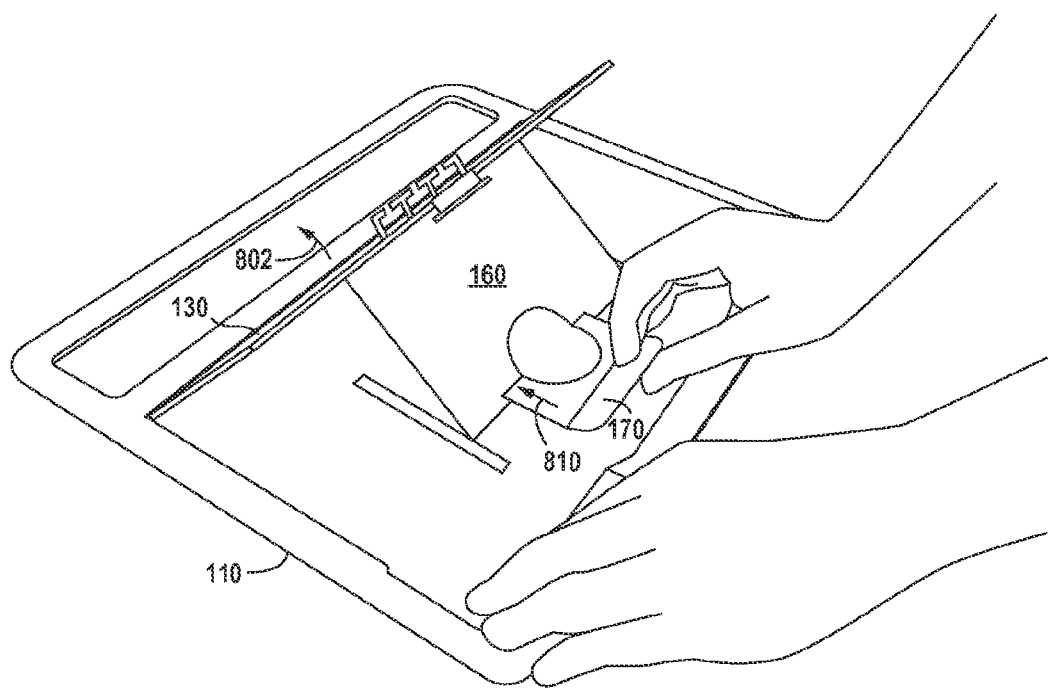
Figure 8O:
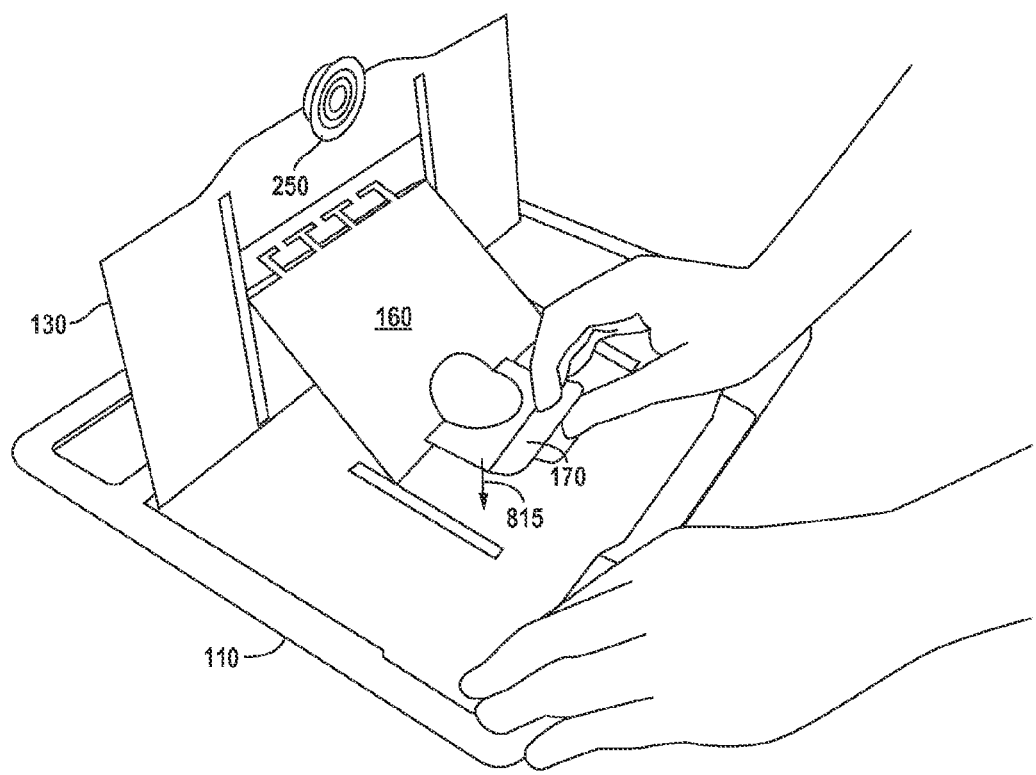
Figure 9A:
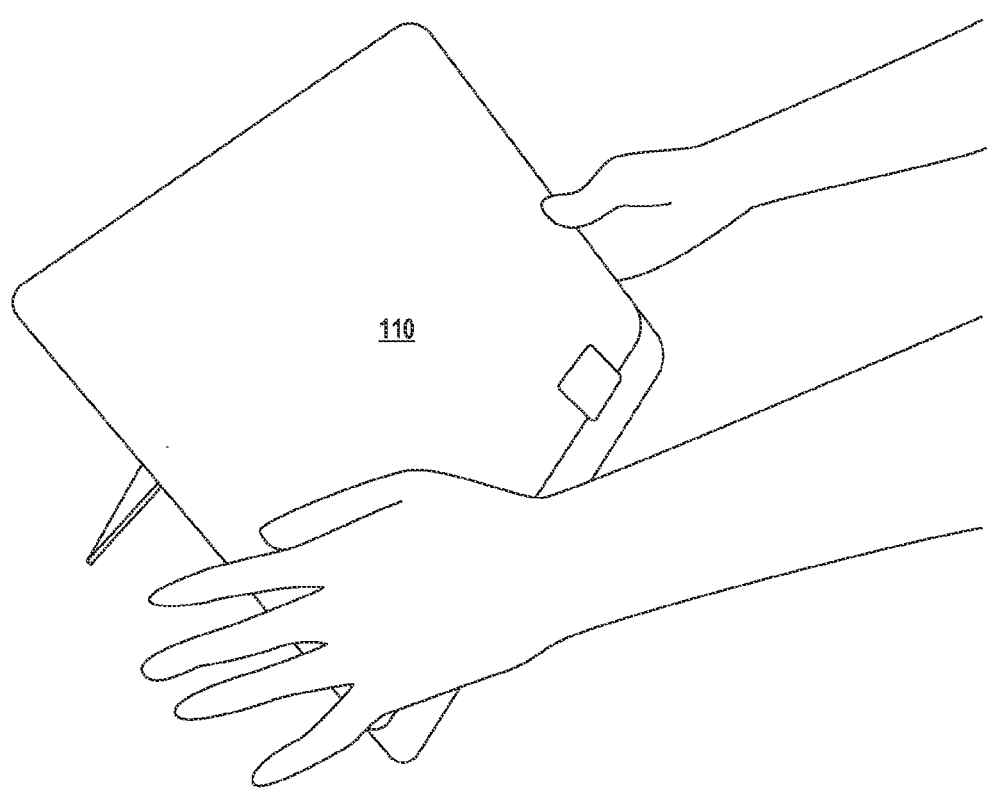
FIGS. 9A-9H are a time ordered sequence of events of the laptop stand being rotated left and right with a user pushing the platen left and right to effect the rotations shown.
Figure 9B:
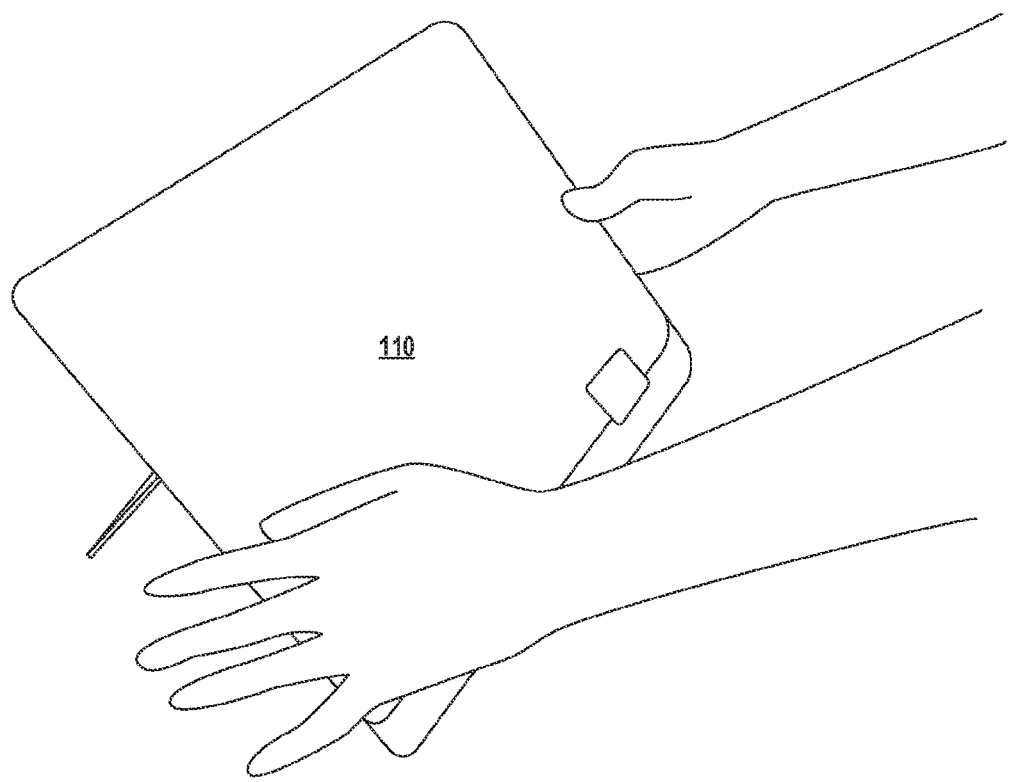
Figure 9C:
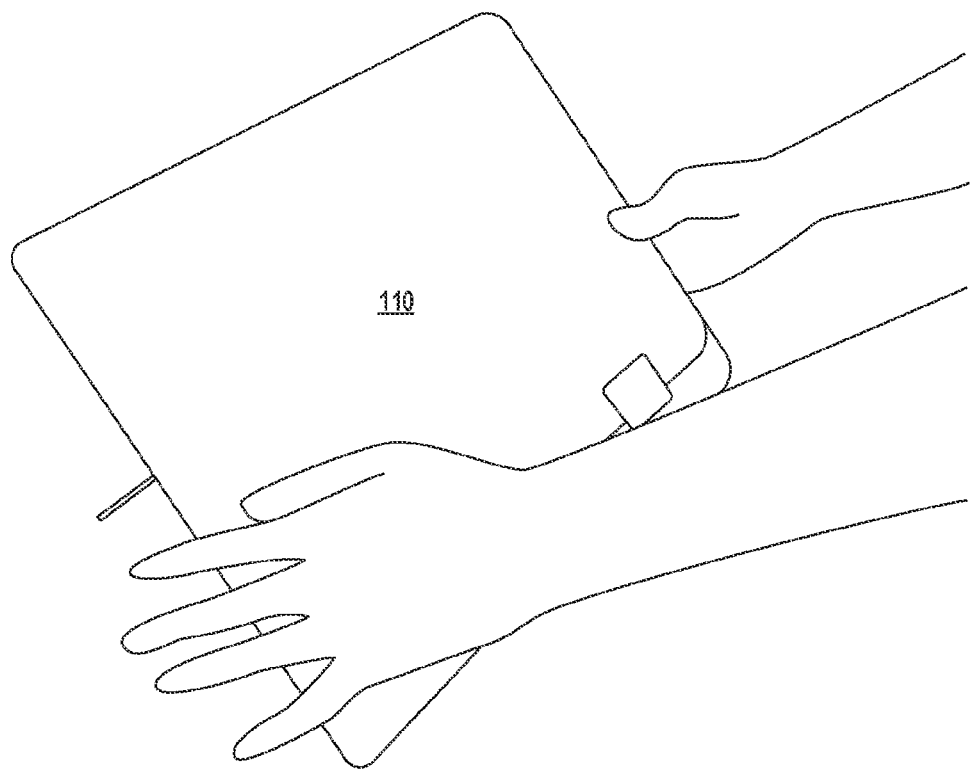
Figure 9D:
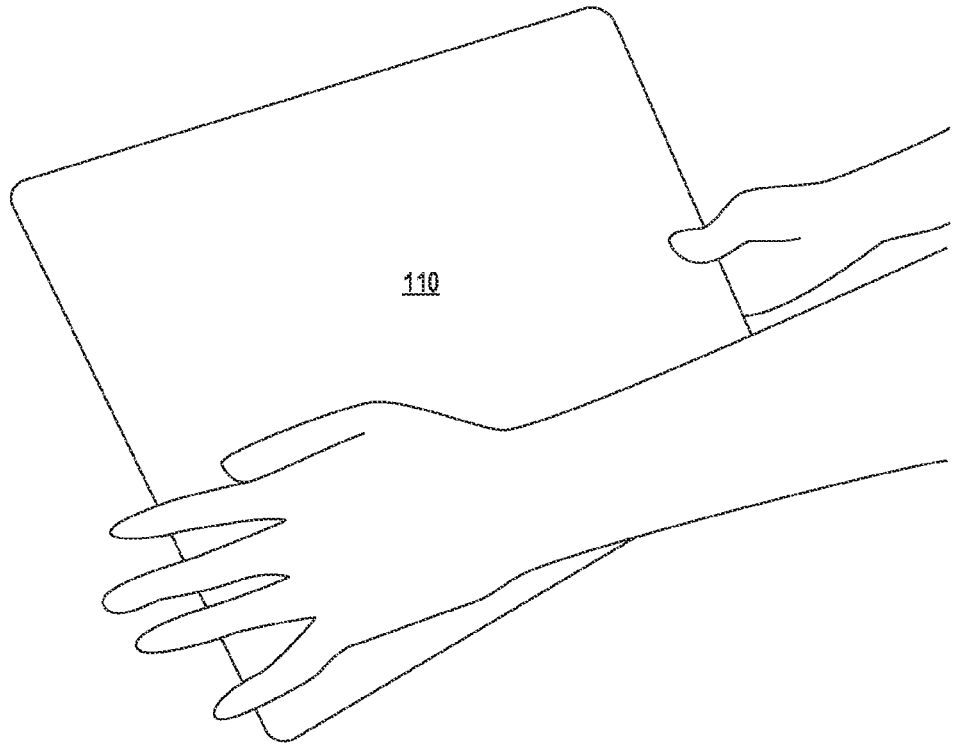
Figure 9E:
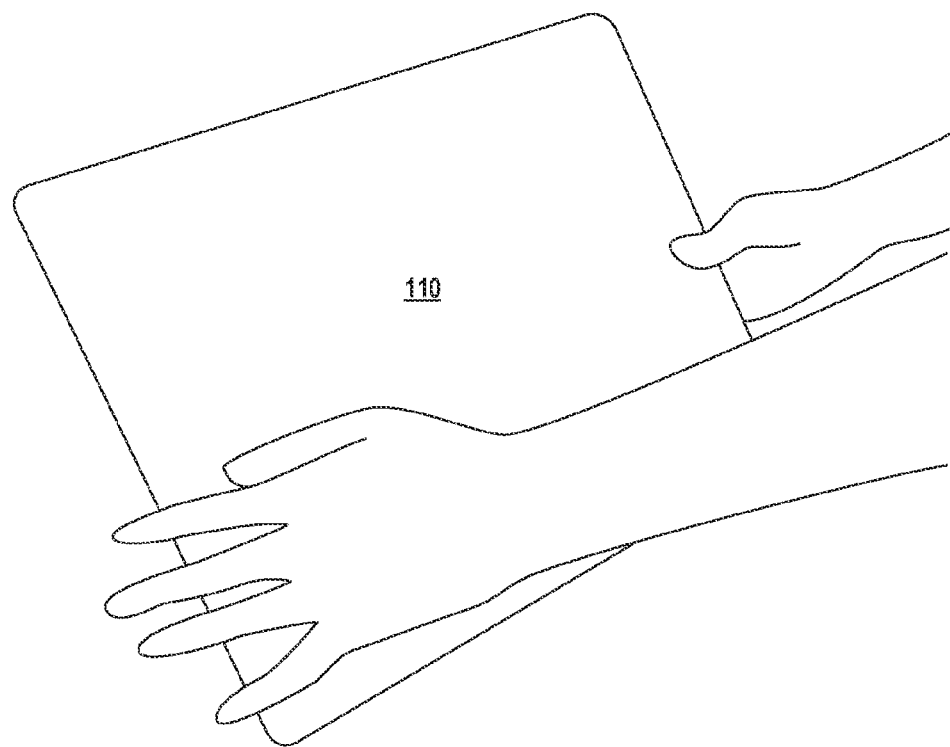
Figure 9F:
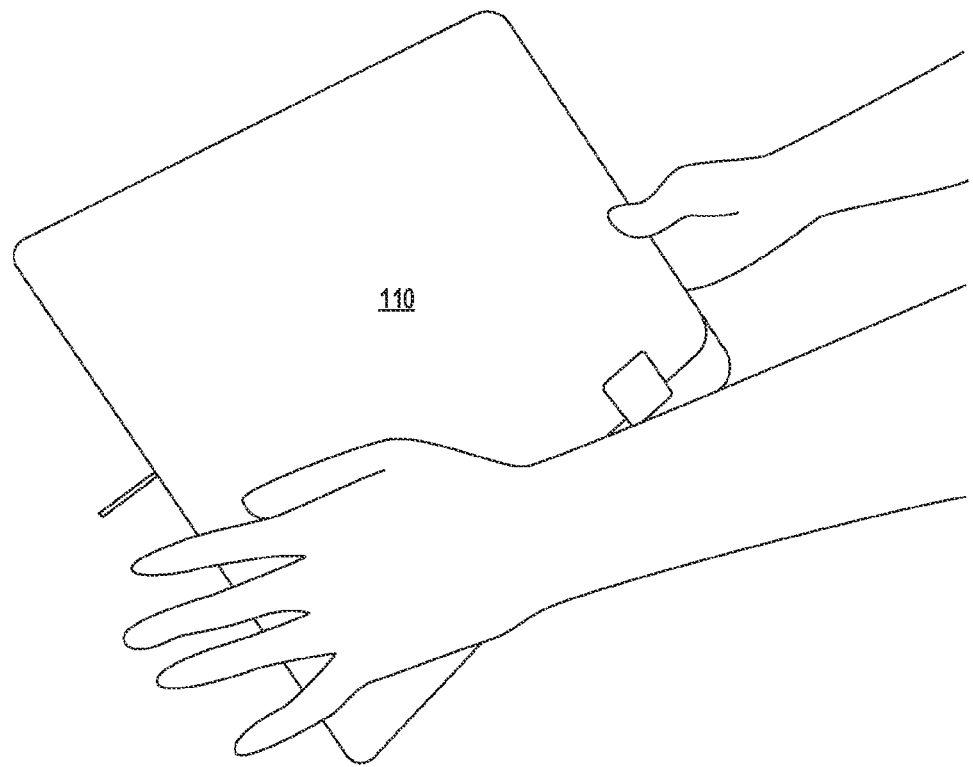
Figure 9G:
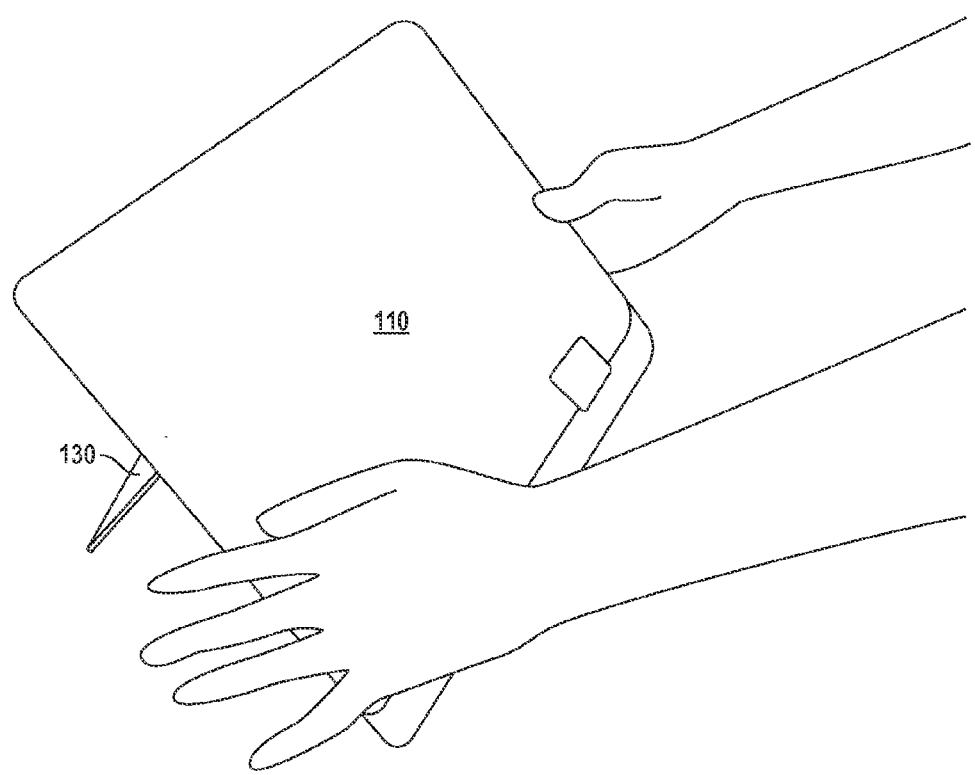
Figure 9H:
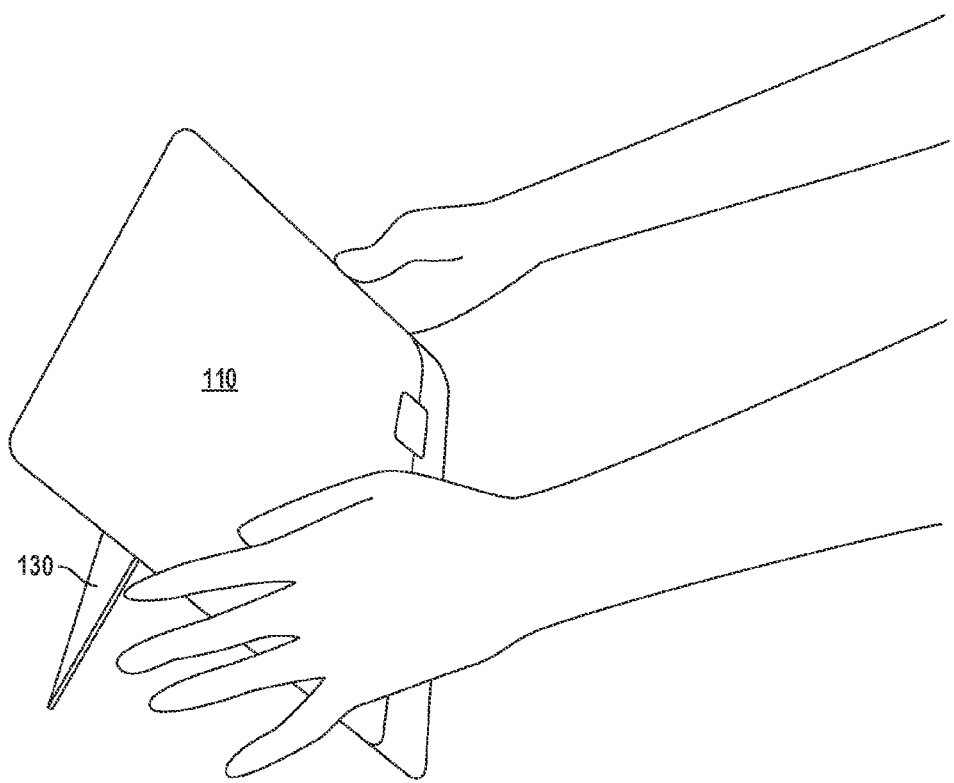

According to one embodiment, the latch may be configured to behave as a spring device to push the support arm and the leg from the platen opening 230. With the support arm and leg folded into opening 230, the latch may be lifted (e.g., to unlatch the latch from the platen), and then may be pushed downward to push the support arm and platen out from opening 230. Thereafter, the latch may be pushed forward to latch the latching mechanism into one of the complimentary latching mechanisms. FIG. 7A is a simplified schematic of the laptop stand that includes an arrow to indicate the direction in which latch 170 is lifted to unlatch the latch from the platen with the support arm and the leg folded into the platen. FIG. 7B is a simplified schematic of the laptop stand that includes an arrow to indicate the direction in which latch 170 is lifted to unlatch the latch from the platen with the support arm and leg unfolded from the platen. FIG. 7C is a side view of the laptop stand showing the latch latched to the platen. FIG. 7D is a simplified side view of the laptop stand showing the latch in an unlatched position. FIGS. 8A-8O show a time ordered sequence of events of a user of the laptop stand lifting the latch from a latched position where the support arm and the leg are folded into the platen. The latch is lifted to begin moving the support arm and the leg out of opening 130. More specifically, the user lifts the latch up and forward (see arrow 800 in FIGS. 8A-8G) to begin pushing the support arm and leg from the opening (see arrow 802 in FIGS. 8A-8G), and then pushes the latch down (see arrow 805 in FIGS. 8H-8L) to finish lifting the support arm and the leg from the opening (see arrow 802 in FIGS. 8H-8L). The user then slides the latch forward (see arrow 810 in FIGS. 8M-8N) to move the support arm in the slots to adjust the leg to the desired angular setting with respect to the platen. With the latch at the desired location, the user then pushes downward on the latch to latch the latch to the platen (see arrow 815 in [FIG. 8O). The support arm and leg may be configured to be folded back into the platen via substantially the reverse order of steps shown in FIGS. 8A-8O.

According to one embodiment of the present invention, leg 130 includes a swivel disk 250 as shown in FIG. 4A and FIGS. 5A-5C. Swivel disk 250 may be hinge mounted to leg 130 and may be configured to rotate with respect to the leg so that the angle between the swivel disk and the leg may be changed as the angle between platen 110 and surface 135 is changed. See the series of FIGS. 5A-5C where the angle φ between the platen 110 and surface 135 is changed, and the angle between swivel disk 250 and leg 130 is changed to accommodate the change in angle φ and to maintain the bottom of the swivel disk substantially parallel and flush with surface 135. The swivel disk may also be spring mounted to the leg. The swivel disk may be configured to substantially align itself with the leg under a spring force if the swivel disk is not in contact with surface 135 (see FIG. 8O). Latch 170 may have an opening 171 formed therein to receive the swivel disk with the swivel disk aligned with the leg and with the leg in the opening in the platen. See FIG. 8A. The swivel disk may be configured to be rotated out from alignment with the leg if the laptop stand is placed on a surface for use. See, for example, FIGS. 5A-5C in which the bottom of the swivel disk is shown substantially parallel and flush to surface 135.

Figure 10A:
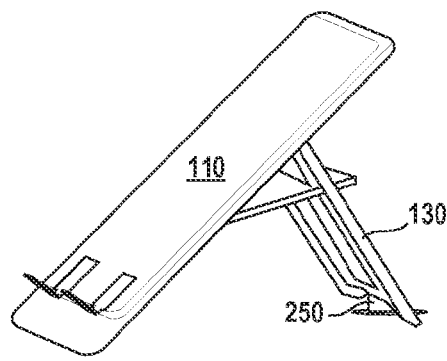
FIGS. 10A-10C are additional images of the laptop stand being rotated about the swivel disk.
Figure 10B:
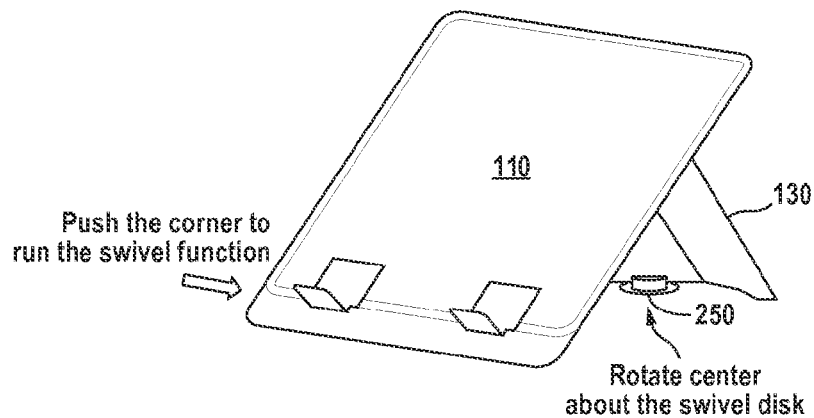
Figure 10C:
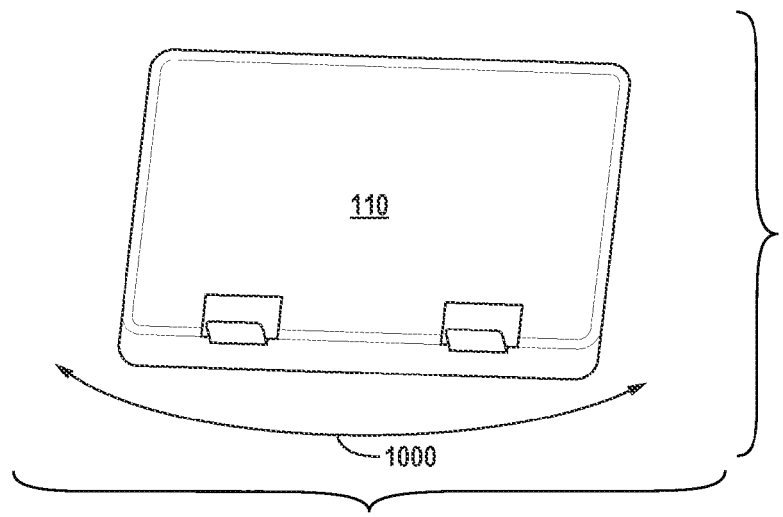

In addition to swivel disk 250 being hinge mounted to leg 130, the swivel disk may also be rotationally mounted to the leg. That is, the swivel disk may be configured to rotate about its center 255 on the leg as indicated by arrow 257 in FIG. 4A. The swivel disk may be coupled to the leg via a pin 258 or the like, which provides for the rotations described above. According to one embodiment, the bottom of the swivel disk may be rubbery so that the swivel disk sticks to a surface on which the laptop stand is placed. Thereby, the laptop stand may be rotated about the swivel disk while the laptop stand is placed on a surface and while the rubbery bottom of the swivel disk sticks to the surface. That is, the swivel disk is the center of rotation of the laptop stand as the laptop stand is rotated on a surface. The platen may be pushed on by a user to affect rotation of the laptop stand about the swivel disk. FIGS. 9A-9H are a time ordered sequence of events of the laptop stand first being rotated left (see FIGS. 9A-9D) and thereafter being rotated right (see FIGS. 9E-9H) with a user pushing the platen left and right to effect the rotations shown in FIGS. 9A-9H. FIGS. 10A-10C are an additional time ordered sequence of images of the laptop stand being rotated about the swivel disk. Arrow 1000 in FIG. 10C indicates the direction of rotation about the swivel disk.

Figure 11A:
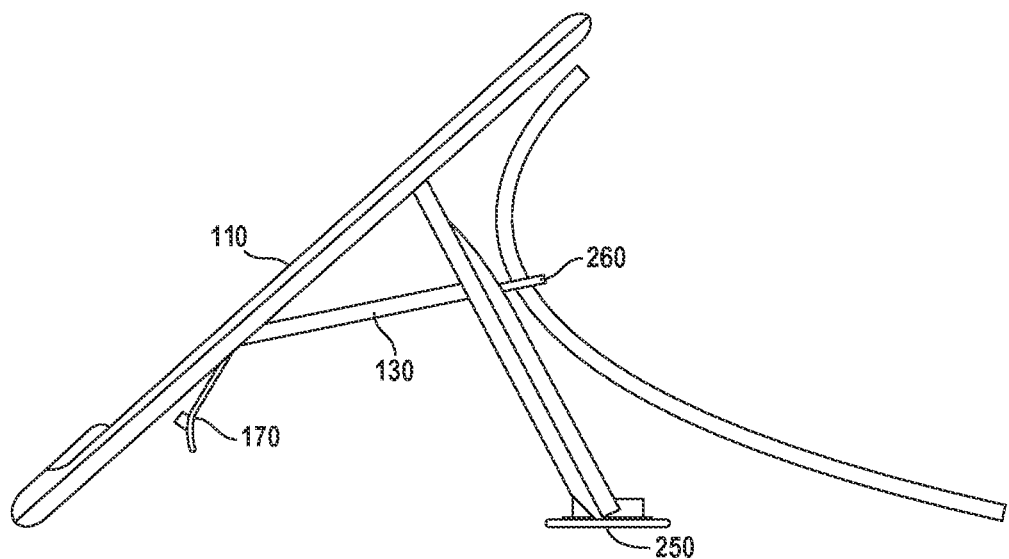
FIGS. 11A-11C are simplified side and back view of the laptop stand and show a cable management device for managing computer cables.
Figure 11B:
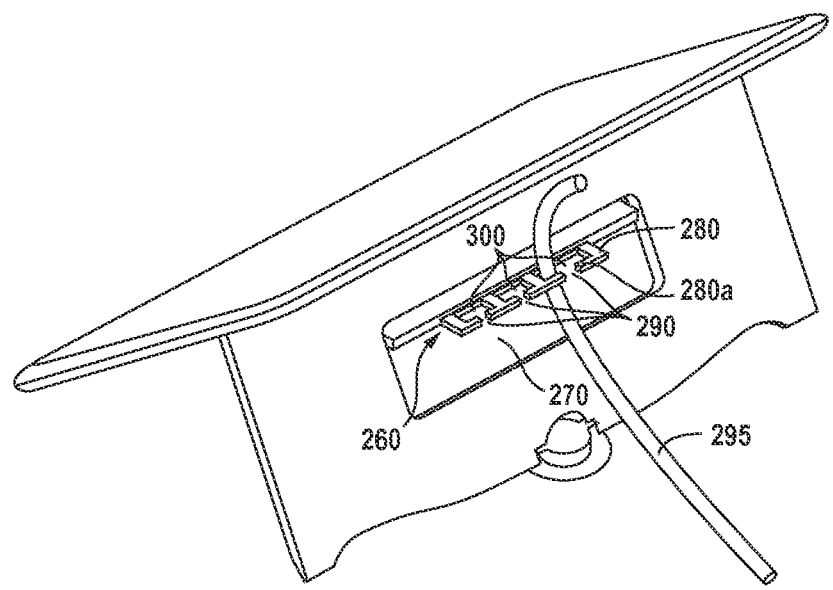
Figure 11C:
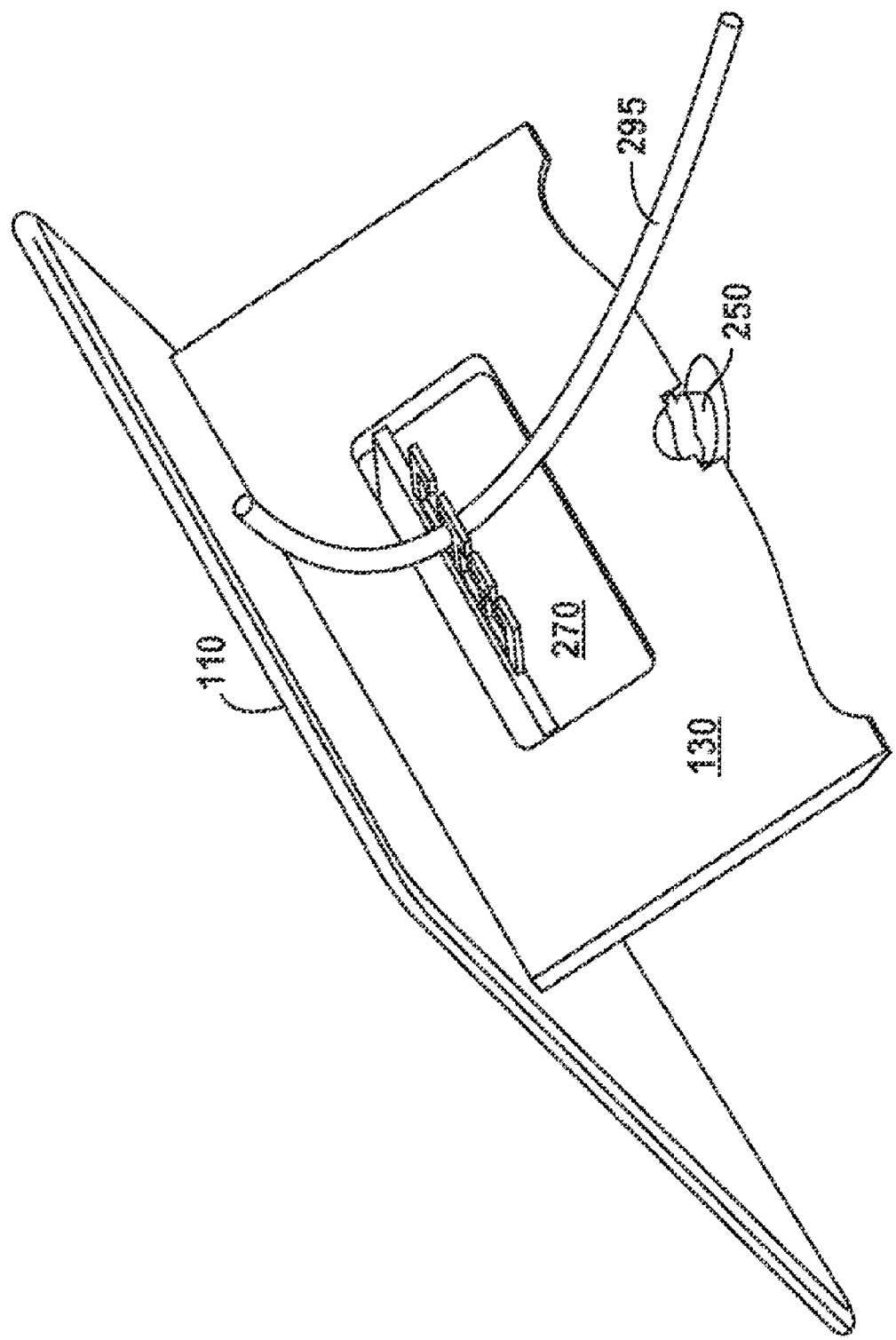

FIGS. 11A-11C are simplified side and back views of the laptop stand and show a cable management device 260 for managing computer cables. According to one embodiment, a rear portion of support arm 160 includes the cable management device 260, which is configured to extend through an opening 270 formed in the leg. The cable management device extends through opening 270 towards the back of the laptop stand and extends away from a forward direction that a laptop computer faces with the laptop computer positioned on the platen. The cable management device includes a plurality of hooked arms 280. Openings 290 are formed between adjacent hooked arms so that computer cables and the like (e.g., cable 295) may be placed into spacings 300 between the hooked arms. Openings 290 may have different widths for accepting cables of various thicknesses. Spacings 300 may also have different widths to hold cables of various thicknesses. The hooked arms 280 may have beveled portions 280a, which are configured to aid in directing a cable through and opening 290 and into a spacing 300. With the cables in spacings 300, the hooked arms are configured to inhibit the cables from moving while the laptop stand is in use with a laptop computer disposed thereon.

It is to be understood that the examples and embodiments described above are for illustrative purposes only and that various modifications or changes in light thereof will be suggested to persons skilled in the art and are to be included within the spirit and purview of this application and scope of the appended claims. For example, while the above description focuses on the use of the laptop stand with a laptop computer, embodiments of the present invention may be used with other devices as well. For instance, embodiments of the present invention may be configured for use with a tablet computer (e.g., an iPad™ of Apple Computer, Inc., of Cupertino Calif.), or may be used with a keyboard alone where a physically separate display (e.g., a computer monitor, a television, etc.) is used in combination with the keyboard. As such, the laptop stand provides the user with ergonomically-comfortable use position for a tablet computer, a keyboard, etc. Therefore, the above description should not be understood as limiting the scope of the invention as defined by the claims.

What is claimed is:

1. A laptop stand configured to support a laptop computer on a surface at a plurality of angles comprising:
   a platen including a surface, the platen configured to support the laptop computer;
   slide mounts disposed on the surface of the platen, each slide mount including a slot formed therein;
   a leg pivotally coupled to the platen;
   a support arm including a pin, the support arm slide-coupled to the slide mounts on the platen via the pin and pivotally coupled to the leg; and
   a latch coupled to the support arm and configured to latch and to unlatch from the platen at a plurality of latch points to position the support arm at a first plurality of angles with respect to the platen and the leg and to position the platen and the leg at a second plurality of angles with respect to one another, wherein the latch is configured to slide with respect to the platen to move the support arm to rotate the leg with respect to the platen, wherein the leg includes a swivel disk coupled to the bottom portion of the leg, and wherein the swivel disk is configured as a rotation center for the leg and the platen positioned on a surface.

2. The laptop stand of claim 1, wherein the latch includes a set of hooks and the platen includes set of openings formed therein to receive the hooks to latch the latch at the latch points.

3. The laptop stand of claim 1, wherein the latch and the platen each include sets of magnets to guide the latch to the latch points.

4. The laptop stand of claim 1, wherein the platen includes a bottom portion and the leg includes a bottom portion configured to contact a surface, and wherein the leg and the platen at the second plurality of angles are configured to angle the laptop computer on the platen at a third plurality of angles with respect to the surface.

5. The laptop stand of claim 1, wherein the swivel disk is hinge coupled to the bottom portion of the leg, wherein the swivel disk is configured to rotate with respect to the leg so that the angle between the swivel disk and the leg can be changed as the angle between the platen and surface is changed.

6. The laptop stand of claim 1, wherein the platen includes an opening formed therein and the leg and support arm are configured to fold into the opening with the latch unlatched from the platen.

7. The laptop stand of claim 6, wherein the platen, the leg, and the support arm are substantially parallel if the leg and support arm are folded into the opening in the platen.

8. The laptop stand of claim 6, wherein the latch is configured as a spring device to lift the support arm and the platen from inside the opening.

9. The laptop stand of claim 8, wherein the latch is configured as the spring device for being pushed downward and upward to lift the support arm and the platen from inside the opening.

10. The laptop stand of claim 6, wherein:
    the platen includes a top configured to support the laptop computer, and
    the platen includes a bottom that is oppositely disposed with respect to the top surface and the bottom includes the opening formed in the platen.

11. The laptop stand of claim 10, wherein the slide mounts are in the opening formed in the bottom of the platen.

12. The laptop stand of claim 1, wherein the leg includes an opening formed therein and the support arm includes a cable management device, which extends at least partially through the opening formed in the leg.

13. The laptop stand of claim 12, wherein the cable management device extends toward a back direction of the laptop stand away from a forward direction a laptop computer faces positioned on the platen.

14. The laptop stand of claim 12, wherein the cable management device includes a plurality of hooked arms, and an opening is formed between adjacent hooked arms.

15. The laptop stand of claim 12, wherein the hooked arms are configured to hold computer cables.

16. A stand configured to support a device on a surface at a plurality of angles comprising:
    a platen configured to support the device, the platen including a surface and a slide mount disposed on the surface, wherein the slide mount includes a slot disposed thereon;
    a leg pivotally coupled to the platen;
    a support arm including a pin, the support arm slide-coupled to the slide mount on the platen via the pin and pivotally coupled to the leg; and
    a latch coupled to the support arm and configured to latch and to unlatch from the platen at a plurality of latch points to position the support arm at a first plurality of angles with respect to the platen and the leg and to position the platen and the leg at a second plurality of angles with respect to one another, wherein the latch is configured to slide with respect to the platen to move the support arm to rotate the leg with respect to the platen, wherein the leg includes a swivel disk coupled to the bottom portion of the leg, and wherein the swivel disk is configured as a rotation center for the leg and the platen positioned on a surface.

17. The stand of claim 16, wherein the latch includes a set of hooks and the platen includes set of openings formed therein to receive the hooks to latch the latch at the latch points.

18. The stand of claim 16, wherein the latch and the platen each include sets of magnets to guide the latch to the latch points.

19. The stand of claim 16, wherein the platen includes a bottom portion and the leg includes a bottom portion configured to contact a surface, and wherein the leg and the platen at the second plurality of angles are configured to angle the device on the platen at a third plurality of angles with respect to the surface.

20. The stand of claim 16, wherein the swivel disk is hinge coupled to the bottom portion of the leg, wherein the swivel disk is configured to rotate with respect to the leg so that the angle between the swivel disk and the leg can be changed as the angle between the platen and surface is changed.

21. The stand of claim 16, wherein the platen includes an opening formed therein and the leg and support arm are configured to fold into the opening with the latch unlatched from the platen.

22. The stand of claim 21, wherein the platen, the leg, and the support arm are substantially parallel if the leg and support arm are folded into the opening in the platen.

23. The stand of claim 21, wherein the latch is configured as a spring device to lift the support arm and the platen from inside the opening.

24. The stand of claim 23, wherein the latch is configured as the spring device for being pushed downward and upward to lift the support arm and the platen from inside the opening.

25. The stand of claim 21, wherein:
   the platen includes a top configured to support the device,
   the platen includes a bottom that is oppositely disposed with respect to the top surface and the bottom includes the opening formed in the platen.

26. The stand of claim 25, wherein the slide mounts are in the opening formed in the bottom of the platen.

27. The stand of claim 16, wherein the leg includes an opening formed therein and the support arm includes a cable management device, which extends at least partially through the opening formed in the leg.

28. The stand of claim 27, wherein the cable management device extends toward a back direction of the stand away from a forward direction a device faces positioned on the platen.

29. The stand of claim 27, wherein the cable management device includes a plurality of hooked arms, and an opening is formed between adjacent hooked arms.

30. The stand of claim 29, wherein the hooked arms are configured to hold computer cables.

\* \* \* \* \*